US010104656B2

United States Patent
Anouar

(10) Patent No.: US 10,104,656 B2
(45) Date of Patent: Oct. 16, 2018

(54) ACCESS METHOD AND PROTOCOL IN AN AD HOC NETWORK

(71) Applicant: THALES, Courbevoie (FR)

(72) Inventor: Hicham Anouar, Gennevilliers (FR)

(73) Assignee: THALES, Courbevoie (FR)

( * ) Notice: Subject to any disclaimer, the term of this patent is extended or adjusted under 35 U.S.C. 154(b) by 125 days.

(21) Appl. No.: 14/982,336

(22) Filed: Dec. 29, 2015

(65) Prior Publication Data

US 2016/0192359 A1 Jun. 30, 2016

(30) Foreign Application Priority Data

Dec. 30, 2014 (FR) ..................................... 14 03024

(51) Int. Cl.
*H04W 84/12* (2009.01)
*H04W 72/04* (2009.01)
*H04L 5/00* (2006.01)
*H04L 1/00* (2006.01)
*H04W 74/04* (2009.01)
*H04W 76/00* (2018.01)
*H04W 84/18* (2009.01)

(52) U.S. Cl.
CPC .......... *H04W 72/0446* (2013.01); *H04L 1/00* (2013.01); *H04L 5/0055* (2013.01); *H04W 74/04* (2013.01); *H04W 76/00* (2013.01); *H04W 84/18* (2013.01)

(58) Field of Classification Search
CPC . H04W 72/0446; H04W 84/18; H04W 84/12; H04W 72/04; H04L 5/0055
See application file for complete search history.

(56) References Cited

U.S. PATENT DOCUMENTS

| 2005/0195784 A1* | 9/2005 | Freedman | H04L 1/06 370/338 |
| 2007/0243874 A1* | 10/2007 | Park | H04W 72/082 455/442 |
| 2009/0109938 A1* | 4/2009 | Singh | H04W 74/0816 370/337 |

(Continued)

OTHER PUBLICATIONS

Shengming Jiang et al., "A Simple Distributed PRMA for MANETs," IEEE Transactions on Vehicular Technology, vol. 51, No. 2, Mar. 1, 2002, pp. 293-305, XP011080642.

(Continued)

*Primary Examiner* — Andrew Lee
(74) *Attorney, Agent, or Firm* — Baker & Hostetler LLP

(57) ABSTRACT

A method for accessing a radio channel in a communication system that includes a plurality of terminals communicating with one another by radio links, a terminal being equipped with transmission and/or reception device, a processor suitable for executing the steps of the method, wherein it uses an access protocol based on a communication frame made up of a plurality of slots S(1), . . . , S(S+2).The first S slots each comprising two mini-slots. The first mini-slot including a request to send data signalling message RTS or data, the second mini-slot comprising a "ready to receive" signalling message, CTS, or data, the slot (S+1) containing a message of RTS type or data, the slot (S+2) containing a message of CTS type and an acknowledgement message placed at the end of the frame in order to acknowledge one or more transmissions taking place on the radio channel.

20 Claims, 11 Drawing Sheets

(56) References Cited

U.S. PATENT DOCUMENTS

| | | | |
|---|---|---|---|
| 2013/0201857 A1* | 8/2013 | Bhargava | H04K 3/222 |
| | | | 370/252 |
| 2014/0004865 A1* | 1/2014 | Bhargava | H04W 74/0816 |
| | | | 455/445 |
| 2016/0219531 A1* | 7/2016 | Yang | H04W 52/262 |
| 2016/0381646 A1* | 12/2016 | Li | H04W 74/0816 |
| | | | 370/338 |
| 2017/0079066 A1* | 3/2017 | Takano | H04W 74/004 |
| 2017/0142755 A1* | 5/2017 | Bhargava | H04W 74/0816 |
| 2017/0188293 A1* | 6/2017 | Mizusawa | H04W 48/16 |

OTHER PUBLICATIONS

Fang et al., "A synchronous, reservation based medium access control protocol for multihop wireless networks," 2003 IEEE Wireless Communications and Networking Conference Record, vol. 2, Mar. 16, 2003, pp. 994-998, XP010639903.

G. Bianchi, "Performance analysis of the IEEE 802.11 distributed coordination function," IEEE Journal on Selected Areas in Communications, vol. 18, No. 3, Mar. 1, 2000, pp. 535-547, XP011449989.

Hicham Anouar et al., "Optimal Constant-Window Backoff Scheme for IEEE 802.11 DCF in Single-Hop Wireless Networks Under Finite Load Conditions," Wireless Personal Communications, vol. 43, No. 4, Jul. 19, 2007, pp. 1583-1602, XP019558036.

* cited by examiner

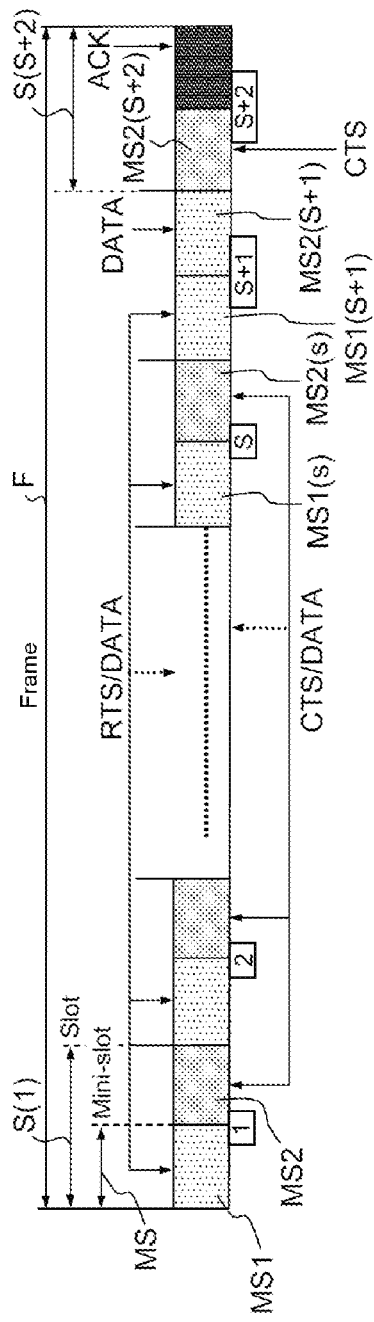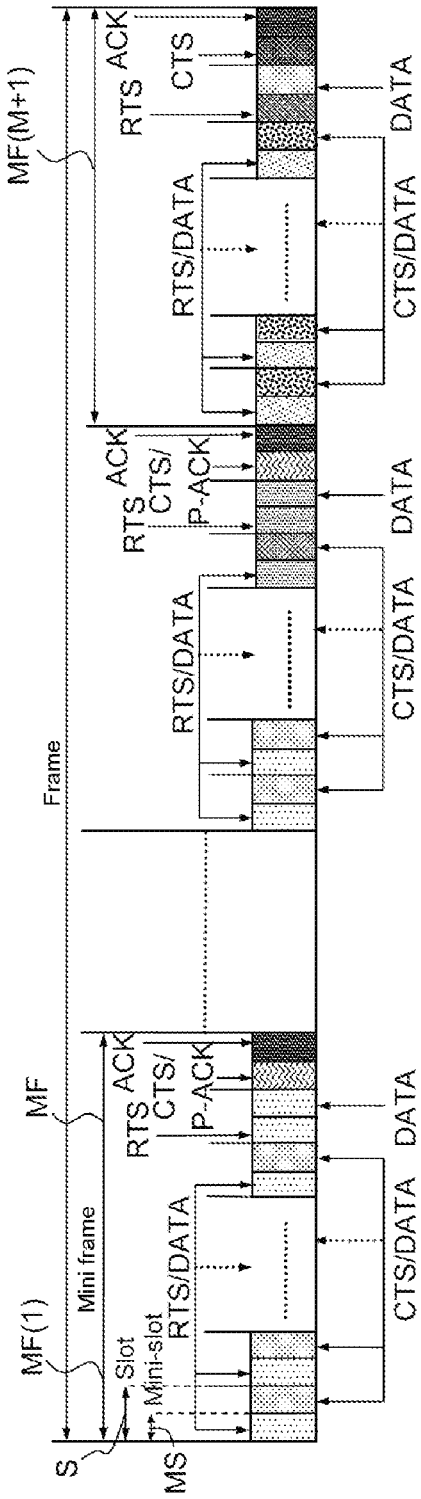
FIG.3A
FIG.3B

ACCESS METHOD AND PROTOCOL IN AN AD HOC NETWORK

CROSS-REFERENCE TO RELATED APPLICATION

This application claims priority to foreign French patent application No. FR 1403024, filed on Dec. 30, 2014, the disclosure of which is incorporated by reference in its entirety.

FIELD OF THE INVENTION

The invention relates to a communication method and an access protocol to the radio channel of an ad hoc network. It applies to the field of ad hoc wireless communication networks and notably defines a distributed access protocol to the radio channel that can reach the theoretical maximum capacity in the asymptotic regime.

Mobile wireless ad hoc networks are characterized by the absence of fixed infrastructure and the absence of full mutual visibility of the nodes, thus rendering any centralized channel access control inappropriate.

BACKGROUND

Historically, the ALOHA protocol is the first distributed random access channel access protocol based on a single-hop access network using packet switching on a radio channel. The channel access control is better known by the abbreviation "MAC", or Medium Access Control. The ALOHA protocol enables each user to transmit data when he or she wishes. If the sender receives a confirmation by the recipient of the correct reception of a packet within a certain period of time, then he or she knows that no conflict has occurred. Otherwise, at the end of this period of time, he or she assumes that a collision has occurred and that the packet must be retransmitted. In order to avoid the continual repetition of the access conflicts, the retransmission time period is random, thus avoiding having users transmit or retransmit at the same instants. A synchronous version of ALOHA is obtained by dividing the time into intervals of durations equal to the duration of transmission of a packet. When two packets are in collision, then they overlap completely rather than partially, leading to an increase in the use of the channel to 36% instead of 18% for the asynchronous ALOHA. The main improvement in the design of the random MAC protocols has been the introduction of the carrier sense multiple access (CSMA) technique. The CSMA protocol reduces the level of interferences provoked by the packet collisions by enabling each terminal to listen beforehand to a channel and detect any transmissions in progress. The MAC protocol of the popular IEEE802.11 standard is widely used for wireless local area networks, FIG. 1A. It employs a multiple access scheme based on listening to the channel and a retransmission mechanism with binary exponential windows. In single-hop networks in which all the nodes mutually see each other, the protocols based on the CSMA protocol achieve a very good use of the transmission or communication channel of the order of 80% [1][2].

The absence of direct visibility between all the nodes of the network has a negative impact on the access protocols based on listening to the channel because of the problem of the hidden terminal illustrated in FIG. 1B where a user A can communicate with a user B within radio or visibility range but cannot communicate with a user C. In order to solve this problem of the hidden terminal, the IEEE 802.11 protocol, FIG. 1C, has defined a second access mechanism which performs a reservation of the channel in the neighbourhoods of the sender and of the receiver. The reservation is obtained by the exchange of two signalling messages, a first request to transmit message, known by the abbreviation RTS (Request To Send) and a second "ready to send" message, better known by the abbreviation CTS (Clear To Send), which block access to the channel for the terminals which receive them. The RTS/CTS mechanism aims to achieve a re-use of the channel with two radio hops. However, the mechanism does not manage to correctly solve the problem of the hidden terminal because its correct operation requires the nodes of the network to have access to all the reservation messages for their neighbourhoods. This constraint is impossible to observe in multiple-hop networks because of the problem of the masked terminal. The problem of the masked terminal therefore greatly degrades the performance levels of the protocol in the multiple-hop networks and this problem is exacerbated when the size of the network increases because the number of hidden/masked terminals also increases. FIG. 1C illustrates the problem of the masked terminal, C.

To the knowledge of the applicant, no protocol in the literature defines a mechanism that can support a maximum re-use of the channel, thus making it possible to achieve the maximum transmission capacity of the channel and achieve the theoretical maximum capacity of an ad hoc network in the model of the channel with collision. This is because, in an optimal access mechanism, only the neighbours of the receivers can access the channel.

SUMMARY OF THE INVENTION

The invention relates notably to a data transmission method, its access protocol for a synchronized network using a time division multiple access mode, known by the abbreviation "TDMA", or a similar access mode, in which the frame is divided into a set of time slots that can contain either reservation signalling of RTS/CTS type, or data, or even signalling acknowledging correct reception of data or an end of transmission.

Hereinafter in the description, the following symbols are used: DATA to designate data, SIG for signalling, RTS for the request to send, CTS for the clear to send state, ACK for the reception acknowledgement, P-ACK for a partial reception acknowledgement, and CAC to designate channel access confirmed.

In the case of the simple variants, the following letters will for example be used to designate the frames and slots involved: F for a frame, S for a slot, MS for a mini-slot, MF for a mini-frame, [F,SIG] for a signalling channel frame, [F, DATA] for a frame of the data channel, [S,SIG] for a slot on the signalling channel, [S,DATA] for a slot of the data channel, [MS,SIG] for a signalling mini-slot, [MS,DATA] for a mini-slot of the data channel, GS for the macro-blocks, and GF for the macro-frames, etc. The added indices will designate the rank of one or other slot, for example MS1 is a first mini-slot of a slot.

The word node or terminal will be used to designate a same object, a mobile radio station. The references 10e designate a sending node or one that wants to send, 10r a recipient or receiving node.

The invention relates to an access method to a radio channel in a communication system comprising a plurality of terminals communicating with one another by radio links, a terminal being equipped with transmission and/or reception means, a processor suitable for executing the steps of the method, and the method is characterized in that it uses an access protocol based on a communication frame made up of a plurality of slots, the first S slots each comprising two mini-slots, the first mini-slot comprising a request to send data signalling message RTS or data, the second mini-slot comprising a "clear to receive" signalling message, CTS, or data, the penultimate slot containing a message of RTS type or data, the last slot containing a message of CTS type and an acknowledgement message placed at the end of the frame in order to acknowledge one or more transmissions taking place on the radio channel.

According to one embodiment, a frame F is divided into (M+1) mini-frames, each mini-frame having the abovementioned frame structure and for the first M mini-frames, the first mini-slot of the last slot contains a CTS message or a partial acknowledgement message P-ACK.

The method is applied for a communication system comprising a plurality of terminals communicating with one another by radio links, a terminal being equipped with transmission and/or reception means, a processor suitable for executing the steps of the method according to the invention, and it is characterized in that it implements at least one signalling channel SIG distinct from a data channel DATA, that it uses an access protocol based on a communication frame (F) made up of a plurality of slots S(1), . . . , S(S+2). The SIG channel takes the RTS and CTS signalling mini-slots, [MS1, SIG] and [MS2, SIG], organized in S+1 slots, whereas the DATA channel takes the S+1 data slots DATA, [S, DATA], and the ACK slot (last slot S+2 of the DATA channel). The last slot S+2 on the SIG channel is not used. The S+1 signalling slots of the SIG channel correspond to the S+1 data slots of the DATA channel. The unused last slot on the signalling channel SIG corresponds to the ACK slot of the DATA channel.

The method uses, for example, at least one signalling channel distinct from a data channel, a frame is divided into (M+1) mini-frames MF, the last mini-frame MF(M+1) has the structure of the preceding frame, for the SIG channel, the first M mini-frames each made up of S+2 slots, the S+1 slots being each made up of a mini-slot for the RTS messages and a mini-slot for the CTS messages, the last slot contains a mini-slot for the partial acknowledgement messages P-ACK and a neutralized mini-slot, on the DATA channel, the first M mini-frames each made up of S+2 slots are used, the first S+1 slots are for data messages, the last slot S+2 is made up of a neutralized mini-slot and a mini-slot for the acknowledgement messages ACK.

The frame F on the signalling channel SIG is made up, for example, in the first "S+1" slots, of three mini-slots distributed as follows: a first mini-slot for the sending of the RTS messages, a second mini-slot for the sending of messages of CTS type, and a third mini-slot for the sending of messages of CAC type.

The method can use a frame made up, in the first "S+1" slots of each mini-frame on the signalling channel, of three mini-slots distributed as follows: a first mini-slot for the sending of the RTS messages, a second mini-slot for the sending of the messages of CTS type, a third mini-slot for the sending of the messages of CAC type, the last slot of the first M mini-frames on the signalling channel SIG is modified to contain three mini-slots: the first for the sending of the messages of P-CAC type, the second for the sending of the messages of P-ACK type, and an unused third mini-slot, the last slot of the first M mini-frames on the data channel DATA is modified to contain three mini-slots: the first two mini-slots are not used and the third mini-slot is reserved for the sending of the ACK messages.

According to a variant embodiment, the frame F is supported by "Ns+Nd" radio channels that are distinct (frequency, code, etc.): "Ns" SIG channels and "Nd" DATA channels where "Nd" is a multiple of "Ns": "Nd=P*Ns", on the SIG channels, the frame contains "S+1" RTS/CTS signalling macro-slots and an unused last slot, each of the signalling macro-slots is made up of "P" slots, and each slot is itself made up of two mini-slots; the first mini-slot transports messages of RTS type and the second mini-slot transports messages of CTS type: the "i"th slot of each macro-slot on the "n"th signalling channel is used for the exchange of RTS/CTS reservation signalling to access the "d"th data channel such that "d=(n−1)*P+i"; on the DATA channels, the frame contains "S+1" DATA macro-slots and a last acknowledgement slot ACK, each of the DATA macro-slots is itself made up of "P" DATA slots.

It is possible to use a frame supported by "Ns+Nd" radio channels that are distinct (frequency, code, etc.): "Ns" SIG (signalling) channels and "Nd" DATA (data) channels, where "Nd" is a multiple of "Ns": "Nd=P*Ns"; on the SIG channels, the frame is divided into "M+1" (M>=0) mini-frames, the last mini-frame takes on the exact form of the SIG frame described above, on the SIG channels, each of the first "M" mini-frames is made up of "S+2" macro-slots: "S+1" RTS/CTS signalling macro-slots and a last P-ACK signalling macro-slot, each of the "S+1" RTS/CTS signalling macro-slots is made up of "P" slots, and each of the "P" slots is itself made up of two mini-slots; the first mini-slot transports messages of RTS type and the second mini-slot transports messages of CTS type, the P-ACK signalling macro-slot is made up of "P" slots which transport messages of P-ACK type and an unused last slot; the "i"th slot of each macro-slot of each mini-frame on the "n"th SIG channel is used for the exchange of RTS/CTS reservation signalling to access the "d"th DATA channel such that "d=(n−1)*P+i"; the "i"th slot of the last P-ACK macro-slot of each mini-frame on the "n"th SIG channel is used for the sending of P-ACK messages corresponding to the DATA channel "d" such that "d=(n−1)*P+i"; on the DATA channels, the frame also contains "M+1" (M>=0) mini-frames; the last mini-frame takes on the form of the DATA frame described above; on the DATA channels, each of the first "M" mini-frames is made up of "S+2" macro-slots: "S+1" DATA macro-slots and a last ACK signalling macro-slot; each of the "S+1" DATA macro-slots is made up of P DATA slots, the ACK signalling macro-slot is made up of "P" unused slots and a last ACK slot to transport messages of ACK type, the last mini-frame takes on the form of the DATA frame described above.

It is possible to modify the frame on the SIG channels in such a way that each slot of the macro-slots is made up of three mini-slots: a first mini-slot for the sending of the RTS messages, a second mini-slot for the sending of the CTS messages, and a third mini-slot for the sending of a message of CAC type.

According to a variant embodiment, the frame is modified on the signalling channels in such a way that each slot of the first "S+1" macro-slots of each mini-frame on the signalling channels is now made up of three mini-slots: a first mini-slot for the sending of the RTS messages, a second mini-slot for the sending of the CTS messages, and a third mini-slot for the sending of a message of CAC type, the last macro-slot of the first M mini-frames on the SIG channels is now made up of 2P+1 slots: P P-CAC slots, P P-ACK slots, and an unused last slot, the last macro-slot of the first M mini-frames on the DATA channels is modified to contain 2P+1 slots: 2P unused slots and a last ACK slot.

The invention relates also to a frame structure intended to be used in a synchronous network with TDMA access, comprising a number "S+2" of slots, characterized in that its structure comprises at least the following elements:
- the first "S" slots each contain two mini-slots, the first mini-slot contains a signalling message of RTS type or data, the second mini-slot contains a CTS signalling message or data,
- the first mini-slot of the penultimate slot "S+1" contains an RTS message or data,
- the second mini-slot of the penultimate slot "S+1" contains data,
- the first mini-slot of the last slot contains a message of CTS type,
- the second mini-slot of the last slot contains an acknowledgement signalling message of ACK type.

BRIEF DESCRIPTION OF THE DRAWINGS

Other features and advantages of the invention will become more apparent on reading the following description of exemplary embodiments given in an illustrative and nonlimiting manner, with attached figures which represent.

DETAILED DESCRIPTION

Figure 1A:
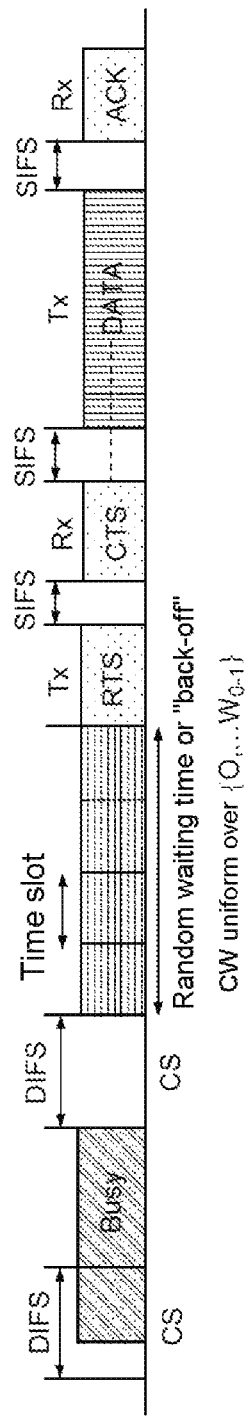
FIGS. 1A, 1B and 1C, different protocols of the prior art and an illustration of the issue of the hidden terminal and of the masked terminal, FIG. 2, a schematic representation of a communication network in which the invention can be implemented, FIG. 3A, a first exemplary protocol, and FIG. 3B, a variant of the protocol of FIG. 3A in multi-frame version, FIG. 4A, a variant embodiment of FIG. 3A with a signalling channel and a data channel that are separate, and FIG. 4B, a variant with multi-frames, FIG. 5A, a variant protocol with a signalling channel and a data channel that are separate and validation of the RTS, and FIG. 5B, a multi-frame variant, FIG. 6A, a variant of the multichannel protocol and FIG. 6B, multi-frames, multichannels, FIG. 7A, a variant of FIG. 6A with validation of the RTS, and FIG. 7B, a variant of 6B with validation of the RTS.
Figure 1B:
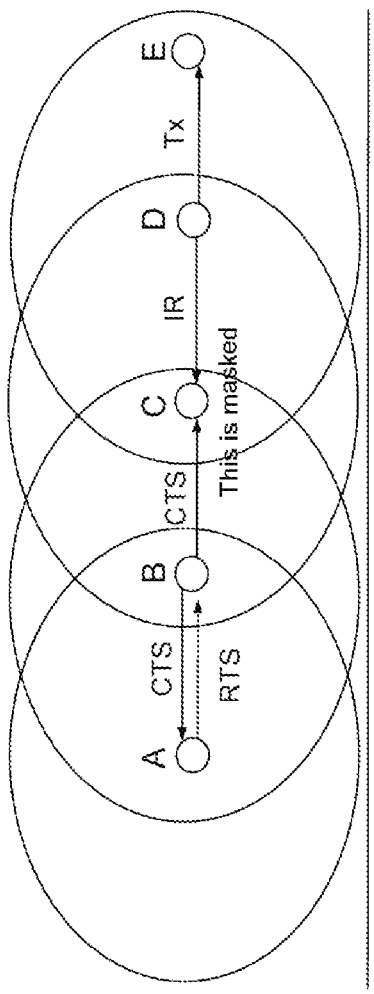
Figure 1C:
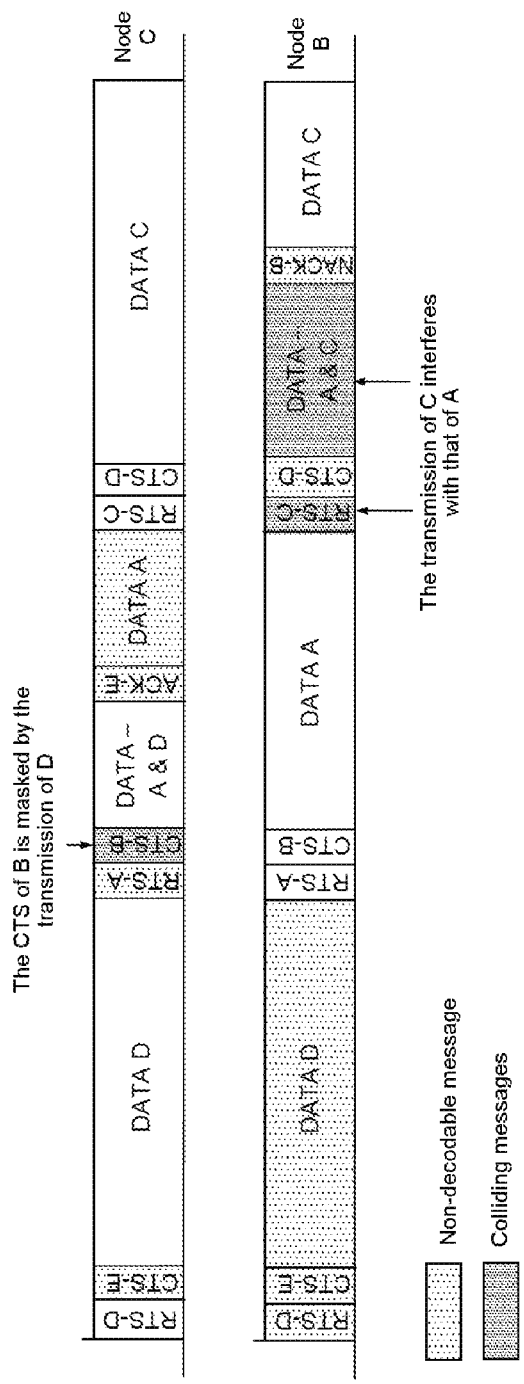
Figure 2:
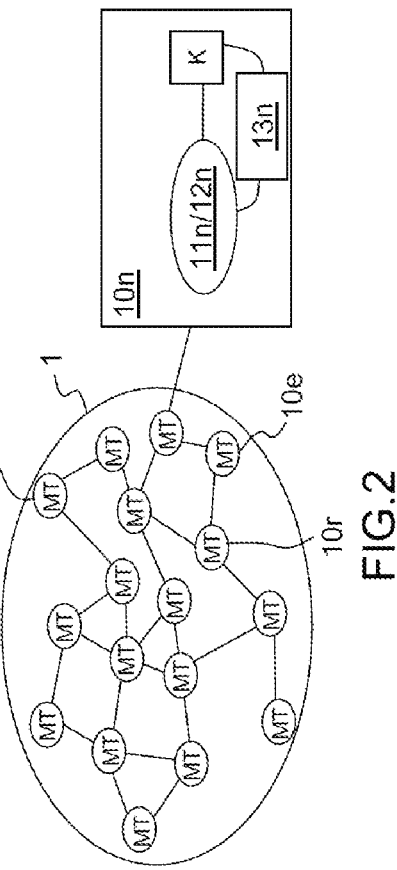

The following example is given in an illustrative and nonlimiting manner in the case of an ad hoc network comprising a plurality of terminals $10n$ communicating with one another by radio links. A terminal $10n$ comprises transmission/reception means, $11n$, $12n$, a processor $13n$ suitable for executing the steps of the different variant implementations of the method, a counter K.

FIG. 3A represents a first exemplary protocol according to the invention. A synchronous network with TDMA access is considered. Each frame F is made up of "S+2" slots $S(1), \ldots, S(S+2)$. The first "S" slots each contain two mini-slots $MS1(s)$, $MS2(s)$. The first mini-slot $MS1(s)$ of each slot can contain either the signalling message of RTS type or data messages of DATA type. The second mini-slot $MS2(s)$ of each slot S can contain either the signalling message of CTS type or data messages of DATA type. The first mini-slot $MS1(S+1)$ of the slot "S+1" can contain the message of RTS type or data. The second mini-slot $MS2(S+1)$ can contain only data. The first mini-slot $MS1(S+2)$ of the slot "S+2" can contain only the message of CTS type. The second mini-slot $MS2(S+2)$ can contain only the acknowledgement signalling message of ACK type. A data transmission can take place in any slot of the frame but must necessarily end at the end of the frame in which the transmission of the data began before the last slot.

The implementation of the transmission method with this type of frame comprises the steps described hereinbelow.

Phase A

A node which is not transmitting listens to the channel. If it detects a transmission on the second mini-slot MS2 ($s$) of one of the first "S" slots, it then prohibits any access to the channel until the end of the current frame Fc, the frame used for the communication. It thus becomes a blocked node on the current frame. If it detects a transmission on the first mini-slot $MS1(S+2)$ of the slot "S+2" of the current frame Fc, it then prohibits any access to the channel until the end of the next frame Fs. It thus becomes a blocked node on the next frame.

Phase B

A node $10n$ which wants to transmit data draws a random number (mechanism known as random back-off) and initiates a countdown K with the value of the number drawn:

B.1 Over the first "S" slots of the frame:
- B.1.a. The counter K is decremented on each slot s of the current frame Fc if the node does not detect transmission over the entire slot,
- B.1.b. The counter K is blocked on each slot s if the node detects a transmission on the first mini-slot (RTS or data), $MS1(s)$,
- B.1.c. The counter K is blocked until the end of the current frame Fc if the node correctly decodes an RTS message which is intended for it,
- B.1.d. The counter is blocked until the end of the frame Fc if the node detects a transmission on the second mini-slot (CTS or data), $MS2(s)$, B.2. The "S+1"th slot and the "S+2"th slot of the frame Fc:
- B.2.a. The counter K is decremented once if the node does not detect transmission on the first mini-slot $MS1(S+1)$ of the slot S+1 and the first mini-slot $MS1(S+2)$ of the slot S+2,
- B.2.b. The counter K is blocked until the end of the next frame if the node correctly decodes an RTS message which is intended for it,
- B.2.c. The counter K is blocked until the end of the next frame if the node detects a transmission on the first mini-slot (CTS), $MS1(S+2)$.

Phase C

On expiry of the counter K, when the value of the counter K reaches 0, the node transmits a message of RTS type to notify its wish to transmit to a recipient node. This transmission takes place:

C.1. On the first mini-slot MS1 of the slot following the expiry of the counter K if the counter K expires in the first "S" slots of the frame Fc, C.2. On the first mini-slot MS1 of the frame following the current frame Fc if the counter K expires in the slots "S+1" and "S+2" of the current frame Fc.

Phase D

If the recipient terminal $10r$ correctly receives the request to send message RTS and it is not blocked, then it responds with the sending of a message of CTS type to indicate to the transmitting node $10e$ that it is available for the reception. If the transmission of the RTS message takes place in one of the first "S" slots, then the CTS message is sent on the second mini-slot (CTS slot) $MS2(s)$ of this slot s. If the transmission of the RTS message takes place in the slot "S+1", then the CTS message is sent on the first mini-slot (CTS slot) of the last slot "S+2", $MS1(S+2)$.

Phase E

E.1. If the transmitting terminal 10e of the RTS correctly receives the CTS message, then the transmission of the data begins on the slot following the current frame Fc if the successful RTS/CTS exchange has taken place in one of the first "S" slots of the frame, or on the first slot of the next frame Fs if the RTS/CTS exchange has taken place on the last slots "S+1" and "S+2" of the current frame Fc. Thus, the communication can begin on any slot of the frame on expiry of the counter K and after a successful RTS/CTS exchange, but it necessarily ends at the end of the frame Fc or of the frame Fs in which the data transmission began just before the last slot, E.2. If the transmitting terminal 10e of the RTS does not correctly receive the CTS message, then it will be able to either abort the current transmission of the data, or try again to access the channel by once again following the steps B to E until the CTS message is correctly received. If the transmitting node fails to receive the CTS message after a predefined number of attempts, then it aborts the current transmission of the data.

Phase F

A recipient 10r or receiving node transmits, on the last mini-slot MS2(S+2) of the frame, a message of acknowledgement type ACK, to inform the transmitting node 10e of the state of reception of the data.

A first multi-frame variant embodiment is schematically represented in FIG. 3B. A synchronous network with TDMA access is considered.

The frame is divided into "M+1" (M>=0) mini-frames MF(f). The first "M" mini-frames are optional, the last mini-frame MF(F+1) is mandatory and takes on the exact form of the basic frame described in FIG. 3A. Each mini-frame is made up of "S+2" slots.

The first "S" slots of each mini-frame MF each contain two mini-slots MS1, MS2. The first mini-slot MS1($s$) of each slot s can contain either the signalling message of RTS type, or data messages of DATA type. The second mini-slot MS2($s$) of each slot s can contain either the signalling message of CTS type or data messages of DATA type.

The first mini-slot of the slot "S+1" of each mini-frame [MS1(S+1), MF] can contain the message of RTS type or data. The second mini-slot [MS2(S+1), MF] can contain only data.

The last slot "S+2" of a mini-frame MF is defined as follows:

In the first "M" mini-frames: the first mini-slot of the slot "S+2", MS1(S+2) of each mini-frame MF, can contain signalling messages of CTS or P-ACK (Partial ACK) type. The second mini-slot "S+2", MS2(S+2), can contain only the acknowledgement signalling message of ACK type.

In the last mini-frame MF(F+1): the first mini-slot [MS1 (S+2), MF(F+1)] of the slot "S+2" can contain only the message of CTS type. The second mini-slot [MS2(S+ 2), MF(F+1)] can contain only the acknowledgement signalling message of ACK type.

A data transmission can take place on one or more mini-frames but must necessarily end at the end of one of the mini-frames of the frame in which the data transmission began.

The steps associated with the transmission method implementing this type of frame are for example described hereinbelow.

Phase A

A node which is not transmitting listens to the channel. If it detects a transmission on the second mini-slot of the first "S" slots of the mini-frame, [MS2($s$), MFc], it then prohibits any access to the channel until the end of the current mini-frame, the mini-frame used for the communication, it thus becomes a blocked node on the current mini-frame. If it detects a transmission on the first mini-slot of the slot "S+2" of the current mini-frame MFc, [MS1(S+2), MFc], it then prohibits any access to the channel until the end of the next mini-frame, so it becomes a blocked node on the next mini-frame.

Phase B

A node 10e which wants to transmit data draws a random number (mechanism known as random back-off) and initiates a countdown K with the value of the number drawn:

B.1. On the first "S" slots of the mini-frame:
  B.1.a. The counter K is decremented on each slot of the current frame Fc if the node 10e does not detect transmission over the entire slot,
  B.1.b. The counter K is blocked on each slot if the node 10e detects a transmission on the first mini-slot (RTS or data), [MS1($s$), Fc],
  B.1.c. The counter K is blocked until the end of the reception if the node 10e correctly decodes an RTS message which is intended for it, the end of reception is indicated in the RTS message,
  B.1.d. The counter K is blocked until the end of the current mini-frame MFc if the node detects a transmission on the second mini-slot (CTS or data), MS2($s$), B.2. On the "S+1"th slot and "S+2"th slot of the mini-frame:
  B.2.a. The counter K is decremented if the node does not detect transmission on the first mini-slot MS1(S+1) of the slot S+1 and on the first mini-slot MS1(S+2) of the slot S+2,
  B.2.b. The counter K is blocked until the end of the reception if the node correctly decodes an RTS message which is intended for it, the end of reception is indicated in the RTS message,
  B.2.c. The counter K is blocked until the end of the next mini-frame if the node detects a transmission on the first mini-slot (CTS or P-ACK), MS1(S+2).

Phase C

On expiry of the counter K, when the value of the counter K reaches 0, the node 10e transmits a message of the RTS type to notify its wish to transmit to a recipient node. This transmission takes place:

C.1. On the first mini-slot following the expiry if the counter K expires in the first "S" slots of the current mini-frame MFc, C.2. On the first mini-slot of the next mini-frame if the counter K expires on the slots "S+1" and "S+2" of the current mini-frame MFc.

Phase D

If the recipient terminal 10r correctly receives the request to send message RTS and it is not blocked, then the recipient node 10r responds with the sending of a message of the CTS type to indicate to the transmitting node that it is available for the reception. If the transmission of the RTS message takes place in one of the first "S" slots, then the CTS is sent on the second mini-slot (CTS slot) of this slot MS2($s$). If the transmission of the RTS message takes place on the slot "S+1", then the CTS is sent on the first mini-slot (CTS slot) of the last slot "S+2", MS1(S+2).

Phase E

E.1 If the transmitting terminal 10e of the RTS correctly receives the CTS message, then the transmission of the data begins on the next slot if the successful RTS/CTS exchange has taken place in one of the first "S" slots of the current mini-frame, or on the first slot of the next mini-frame if the RTS/CTS exchange has taken place on the last slots "S+1" and "S+2" of the current mini-frame. Thus, the communication can begin on any slot of the frame on expiry of the counter and after a successful RTS/CTS exchange, and can extend over a plurality of mini-frames, but necessarily ends at the end of one of the mini-frames of the frame in which the transmission of the data began. The transmitting node 10e indicates the last mini-frame of the transmission of the data in its RTS message.

E.2. If the transmitting terminal 10r does not correctly receive the CTS message, then it will be able to either abort the current transmission of the data or try again to access the channel by once again following the steps from B to E until the CTS message is correctly received. If the transmitting node 10e fails to receive the CTS message after a predefined number of attempts, then it aborts the current transmission of the data.

Phase F

A recipient 10r or receiving node sends an ACK message at the end of the last mini-frame of transmission and a P-ACK message at the end of each of the other intermediate mini-frames of the transmission.

Figure 4A:
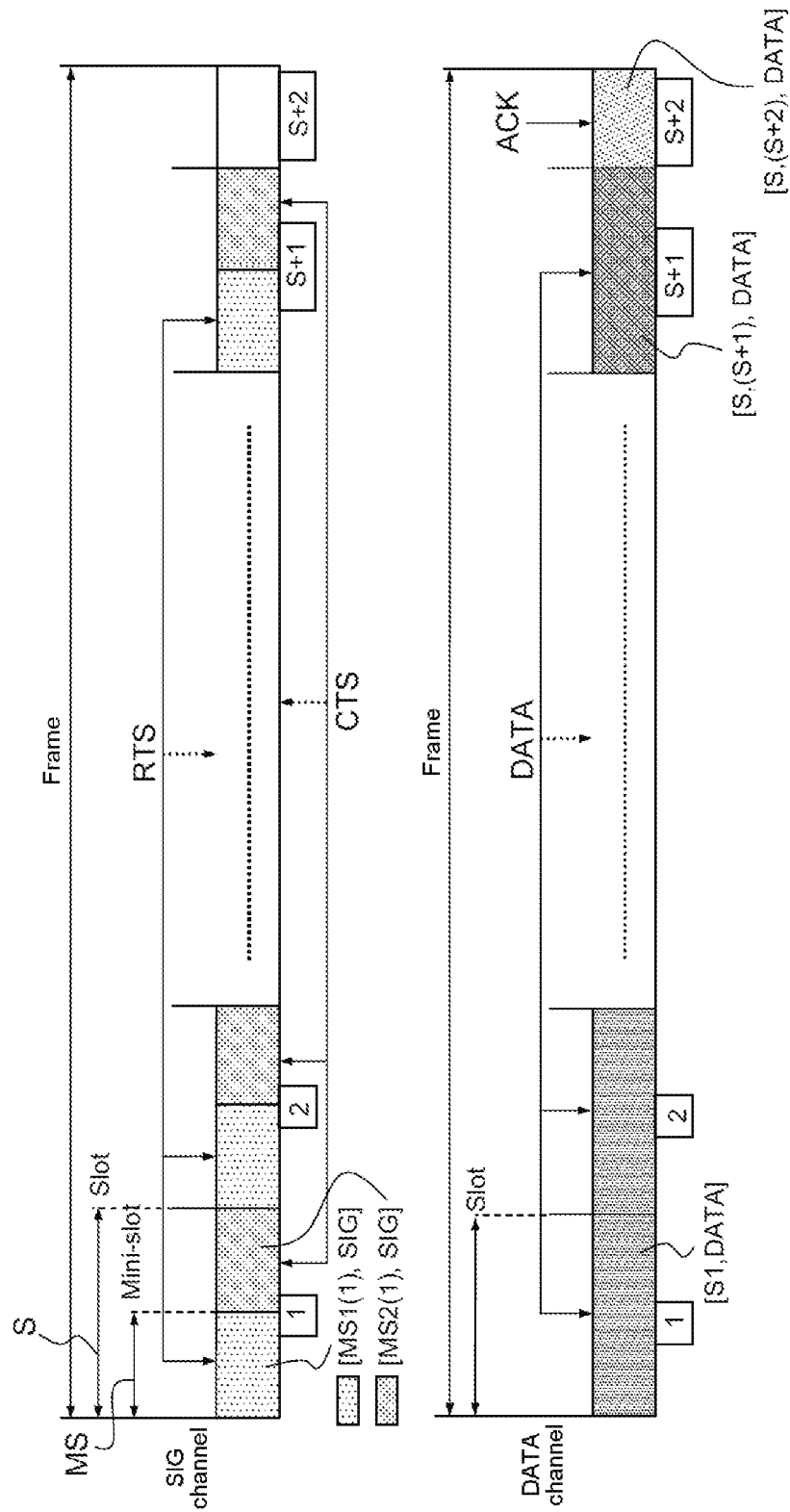

FIG. 4A schematically represents an exemplary implementation for a network in which the signalling channel and the data channel are separated into a SIG channel and DATA channel. It is now considered that the TDMA frame of the basic version of the protocol is supported by two radio channels that are distinct (frequency, code, etc.): a signalling channel, SIG, and a data channel, DATA. Based on FIG. 3A, the SIG channel takes the RTS and CTS signalling mini-slots, [MS1, SIG] and [MS2, SIG], organized in S+1 slots, whereas the DATA channel takes the S+1 data slots DATA, [S, DATA], and the ACK slot (last slot S+2 of the DATA channel). The last slot S+2 on the SIG channel is not used. The S+1 signalling slots of the SIG channel correspond to the S+1 data slots of the DATA channel. The unused last slot on the signalling channel SIG corresponds to the ACK slot of the DATA channel.

The steps of the method using this variant radio channel access protocol comprises the steps described hereinbelow.

Phase A

A node which is not transmitting or receiving on the data channel DATA listens to the signalling channel SIG.

A.1 If it detects a transmission on a CTS mini-slot (second mini-slot MS2($s$)) of the slot s of one of the first "S" slots then it prohibits any access to the RTS mini-slots (first mini-slot of the slot MS1) of the signalling channel SIG until the end of the current frame Fc, so it becomes a node blocked in transmission on the current frame Fc, A.2. If it detects a transmission on the CTS mini-slot of the slot "S+1", MS2(S+1), then it prohibits any access to the RTS mini-slots of the signalling channel SIG until the end of the next frame Fs, so it becomes a node blocked in transmission on the next frame Fs, A.3. If it detects a transmission on an RTS mini-slot (first mini-slot of the slot) of one of the first "S" slots, MS1($s$), then it prohibits any access to the CTS mini-slots (second mini-slot of the slot) of the signalling channel SIG until the end of the current frame Fc, so it becomes a node blocked in reception on the current frame Fc, A.4. If it detects a transmission on the RTS mini-slot of the slot "S+1", MS1(S+1), then it prohibits any access to the CTS mini-slots of the signalling channel SIG until the end of the next frame Fs, so it becomes a node blocked in reception on the next frame Fs.

Phase B

B.1. A node 10e wanting to transmit draws a random number and initiates a countdown, K, with the value of the number drawn, B.2. The counter K is decremented on each slot if the node 10e does not detect transmission on the CTS mini-slot of the slot [MS2($s$), SIG], B.3. The counter K is blocked until the end of the current frame Fc if the node 10e correctly decodes an RTS message which is intended for it, B.4. On the first "S" slots of the frame Fc, the counter K is blocked until the end of the current frame Fc if the node 10e detects a transmission on the CTS mini-slot of the slot, [MS2($s$), SIG], B.5. On the slot "S+1" of the frame Fc, the counter K is blocked until the end of the next frame Fs if the node 10e detects a transmission on the CTS mini-slot of the slot, [MS2(S+1), SIG], B.6. The counter K is blocked during the slot "S+2".

Phase C

On expiry of the counter K, the node 10e transmits a message of the RTS type to notify its wish to transmit to the recipient. This transmission takes place on the signalling channel SIG, C.1. On the first mini-slot of the slot following the expiry of the counter K, MS1($s$+1), if the counter K expires in the first "S" slots of the frame, C.2. On the first mini-slot of the first slot of the next frame Fs if the counter expires on the slot "S+1" of the current frame Fc.

Phase D

If the recipient terminal 10r correctly receives the request to send message RTS and it is not blocked in reception, then the recipient node 10r responds with the sending of a message of the CTS type to indicate to the transmitting node 10e that it is available for the reception. The transmission of the CTS message takes place on the second mini-slot (CTS slot) of the slot in which the transmission of the RTS message took place, MS2($s$, RTS).

Phase E

E.1. If the transmitting terminal 10e of the RTS correctly receives the CTS message, then the transmission of the data begins, on the DATA channel, on the next slot (s+1) if the successful RTS/CTS exchange has taken place in one of the first "S" slots of the frame, or on the first slot S1(Fs=Fc+1) of the next frame Fs if the RTS/CTS exchange has taken place on the slot "S+1" of the current frame Fc. Thus, the communication can begin on any slot of the frame on expiry of the counter K and after a successful RTS/CTS exchange, but it necessarily ends at the end of the frame in which the transmission of data began just before the last slot, E.2. If the transmitting terminal 10e does not correctly receive the CTS message, then it will be able to either abort the current transmission of the data or try once again to access the channel by once again following the steps of the phases C to E until the CTS message is correctly received. If the transmitting node 10e fails to receive the CTS message after a predefined number of attempts, then it aborts the current transmission of the data.

Phase F

A receiving node 10r sends on the DATA channel, on the last slot (S+2) of the current frame Fc, a message of the ACK type to inform the transmitter of the state of reception of the data.

Figure 4B:
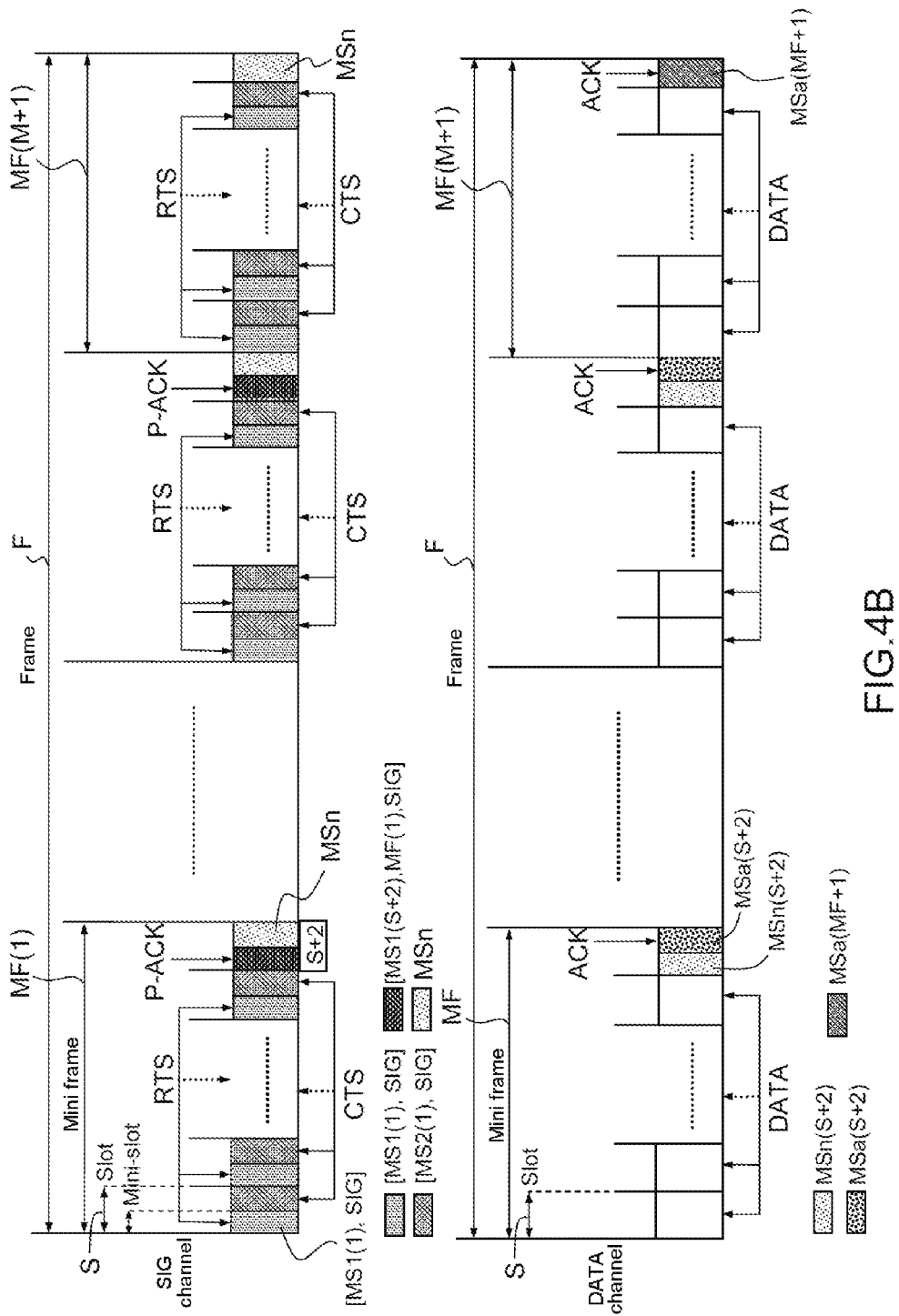

FIG. 4B represents a variant in the case of multi-frames MF on a signalling channel and a data channel that are distinct. The frame F is divided into "M+1" (M>=0) mini-frames MF(1), . . . , MF(M+1). The first "M" mini-frames are optional, the last mini-frame MF(M+1) is mandatory and takes on the exact form of the frame of the variant described in FIG. 4A. The signalling channel SIG takes the RTS, CTS and P-ACK signalling slots whereas the data channel DATA takes the data slots and the ACK slots. On the signalling channel SIG, the first "M" mini-frames MF are each made up of "S+2" slots. The first "S+1" slots are each made up of a mini-slot for the RTS messages, [MS1, MF, SIG] and a mini-slot for the CTS messages, [MS2, MF, SIG]. The last slot (S+2) contains a first mini-slot [MS1(S+2), MF, SIG] for the partial acknowledgement messages P-ACK and a neutralized (unused) second mini-slot [MS2(S+2), SIG], [MSn, MF(M+1)]. The last mini-frame MF+1 takes on the exact form of the frame of the SIG channel (FIG. 4A) except for the last slot which contains only a neutralized mini-slot. On the DATA channel, the first "M" mini-frames are each made up of "S+2" slots. The first "S+1" slots are for the data messages DATA whereas the last slot of a mini-frame is made up of a neutralized mini-slot MSn(S+2) and of a mini-slot MSa(S+2) for the ACK messages. The last mini-frame MF+1 takes on the exact form of the frame of the DATA channel, FIG. 4A, except for the last slot which contains only a mini-slot for the ACK messages, MSa(MF+1).

A data transmission can now take place on one or more mini-frames but must necessarily end at the end of one of the mini-frames of the frame in which the data transmission began.

The method using this type of frames will comprise, for example, the steps described hereinbelow.

Phase A

A node which is not transmitting or receiving on the DATA channel listens permanently to the signalling channel SIG (RTS, CTS, P-ACK).

A.1. If it detects a transmission on a CTS mini-slot (second mini-slot of the slot) of one of the first "S" slots, then it prohibits any access to the RTS mini-slots (first mini-slot of the slot) of the SIG channel until the end of the current mini-frame, so it becomes a node blocked in transmission on the current mini-frame MFc, A.2. If it detects a transmission on the CTS mini-slot of the slot "S+1", [MS2(S+1), MFc, SIG], then it prohibits any access to the RTS mini-slots of the SIG channel until the end of the next mini-frame, so it becomes a node blocked in transmission on the next mini-frame MFs, A.3. If it detects a transmission on the P-ACK mini-slot of the slot "S+2", [MS2(S+2), MFc, SIG], then it prohibits any access to the RTS mini-slots of the SIG channel until the end of the next mini-frame, so it becomes a node blocked in transmission on the next mini-frame MFs. The P-ACK mini-slot is not present on the last mini-frame M+1 of the frame.

A.4. If it detects a transmission on an RTS mini-slot (first mini-slot of the slot) of one of the first "S" slots, [MS1($s$), MFc, SIG], then it prohibits any access to the CTS mini-slots (second mini-slot of the slot) of the signalling channel SIG until the end of the current mini-frame, so it becomes a node blocked in reception on the current mini-frame MFc, A.5. If it detects a transmission on the RTS mini-slot of the slot "S+1", [MS1(S+1), MFc, SIG], then it prohibits any access to the CTS mini-slots of the SIG channel until the end of the next mini-frame, so it becomes a node blocked in reception on the next mini-frame MFs.

Phase B

A node 10$e$ wanting to transmit draws a random number and initiates a countdown, K, with the value of the number drawn, B.1. The counter K is decremented on each slot if the node does not detect transmission on the CTS mini-slot of the slot, B.2. The counter K is blocked until the end of the reception if the node 10$e$ correctly decodes an RTS message which is intended for it. The end of the reception is indicated in the RTS message, B.3. On the first "S" slots of the mini-frame, the counter K is blocked until the end of the current mini-frame MFc if the node 10$e$ detects a transmission on the CTS mini-slot of the slot, B.4. On the slot "S+1" of the current mini-frame MFc, the counter K is blocked until the end of the next mini-frame MFs=MF(c+1) if the node detects a transmission on the CTS mini-slot of the slot, [MS2(S+1), MFc, SIG], B.5. On the slot "S+2" of the current mini-frame MFc, the counter K is blocked until the end of the next mini-frame MFs=MF(c+1) if the node detects a transmission on the P-ACK mini-slot of the slot, [MS2(S+1), MFc, SIG]. The P-ACK mini-slot is not present on the last mini-frame M+1 of the frame, B.6. The counter K is blocked during the slot "S+2" of each mini-frame MF.

Phase C

On expiry of the counter K, the node 10$e$ transmits a message of the RTS type to notify its wish to transmit to the recipient. This transmission takes place on the SIG channel, C.1. On the first mini-slot of the slot following the expiry if the counter K expires in the first "S" slots of the mini-frame MFc, C.2. On the first mini-slot of the first slot of the next mini-frame MF(c+1) if the counter K expires on the slot "S+1" of the current mini-frame MFc.

Phase D

If the recipient terminal 10$r$ correctly receives the request to send message RTS and it is not blocked in reception, then the recipient node 10$r$ responds with the sending of a message of the CTS type to indicate to the transmitting node that it is available for the reception. The transmission of the CTS message takes place on the second mini-slot (CTS slot) of the slot in which the transmission of the RTS message took place.

Phase E

E.1. If the transmitting terminal 10$e$ of the RTS correctly receives the CTS message, then the transmission of the data begins, on the DATA channel, on the next slot if the successful RTS/CTS exchange took place in one of the first "S" slots of the current mini-frame MFc, or on the first slot of the next mini-frame MFs if the RTS/CTS exchange took place on the slot "S+1" of the current mini-frame MFc. Thus, the communication can begin on any slot of the frame Fc or Fs on expiry of the counter K and after a successful RTS/CTS exchange, and can extend over a plurality of mini-frames MF, but necessarily ends at the end of one of the mini-frames of the frame Fc or Fs in which the transmission of the data began. The transmitting node 10$e$ indicates the last mini-frame of the data transmission in its RTS message, E.2. If the transmitting terminal 10$e$ does not correctly receive the CTS message, then it will be able to either abort the current transmission of the data, or try again to access the channel by once again following the steps of the phases C to E until the CTS message is correctly received. If the transmitting node fails to receive the CTS message after a predefined number of attempts, then it aborts the current transmission of the data.

Phase F

A recipient node 10$r$ or receiving node sends an ACK message on the DATA channel at the end of the last mini-frame of transmission and a P-ACK message on the signalling channel at the end of each of the other intermediate mini-frames of the transmission.

Figure 5A:
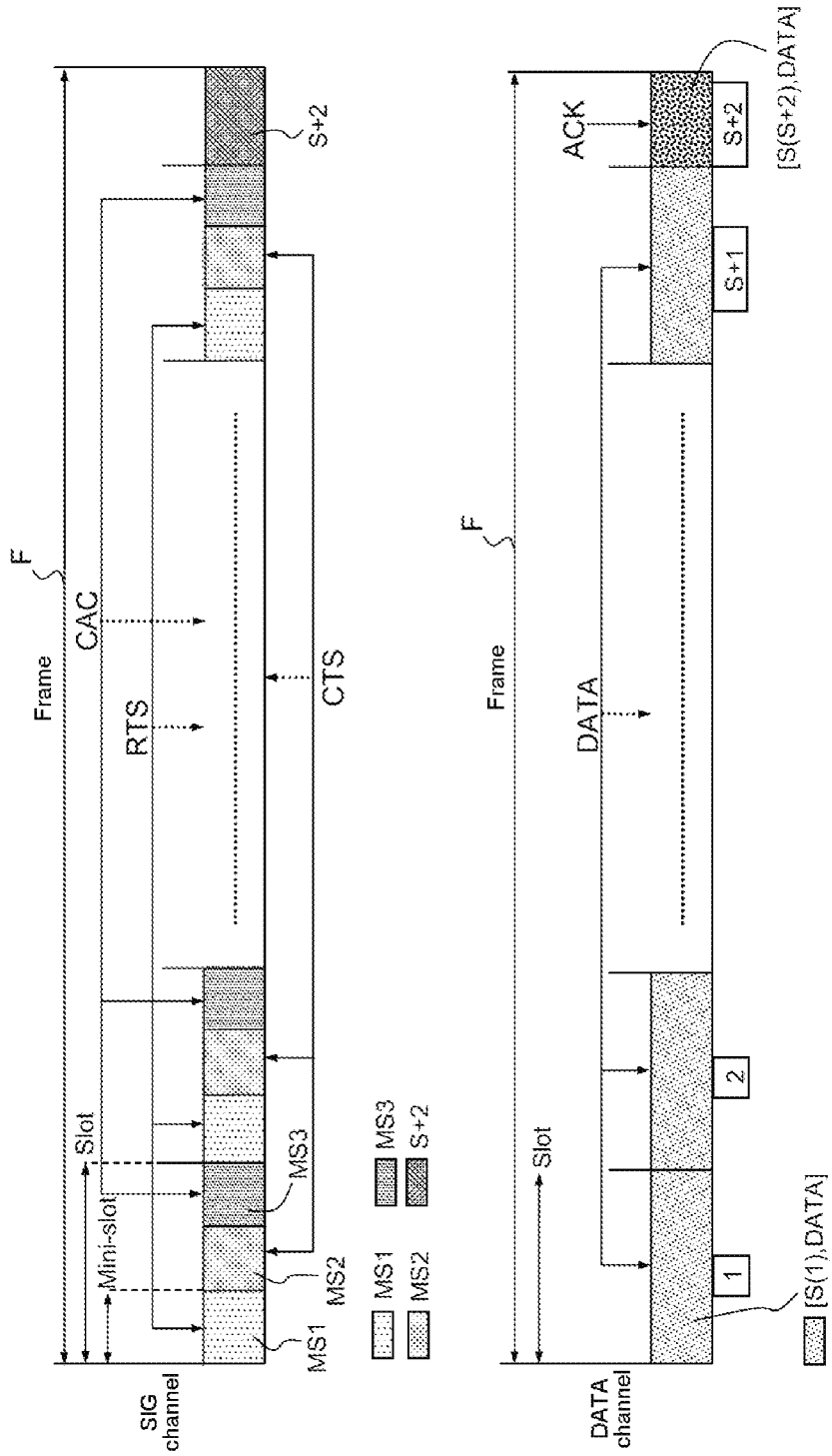

FIG. 5A schematically represents a variant for a signalling channel and a data channel that are separate with a step of validation of the RTS. The TDMA frame of the variant of FIG. 4A of the protocol is taken up and the frame is modified on the signalling channel in such a way that each slot of the first "S+1" slots is now made up of three mini-slots: a first mini-slot MS1 for the sending of the RTS messages, a second mini-slot MS2 for the sending of the CTS messages, and a third mini-slot MS3 for the sending of the messages of channel access confirmation or CAC (Channel Access Confirmed) type. A message of CAC type is sent by a node which has successfully completed an RTS/CTS exchange to inform its neighbourhood that it has indeed received a positive response to its RTS message and that it will therefore effectively access the DATA channel.

The steps of the method implementing such a frame type will then be as follows.

Phase A

A node which is not transmitting or receiving on the DATA channel listens to the SIG channel, A.1. If it detects a transmission on a CTS mini-slot (second mini-slot of the slot) of one of the first "S" slots, [MS2, SIG], then it prohibits any access to the RTS mini-slots (first mini-slot of the slot [MS1, SIG]) of the SIG channel until the end of the current frame, so it becomes a node blocked in transmission on the current frame Fc, A.2. If it detects a transmission on the CTS mini-slot of the slot "S+1", [MS2(S+1), SIG], then it prohibits any access to the RTS mini-slots of the SIG channel until the end of the next frame, so it becomes a node blocked in transmission on the next frame Fs, A.3. If it detects a transmission on the CAC mini-slot (third mini-slot of the slot) of one of the first "S" slots, [MS3, SIG]), then it prohibits any access to the CTS mini-slots of the SIG channel until the end of the current frame, so it becomes a node blocked in reception on the current frame Fc, A.4. If it detects a transmission on the CAC mini-slot (third mini-slot of the slot) of the slot "S+1", then it prohibits any access to the CTS mini-slots of the SIG channel until the end of the next frame, so it becomes a node blocked in reception on the next frame Fs.

Phase B

A node 10e wanting to transmit draws a random number and initiates a countdown K with the value of the number drawn, B.1. The counter K is decremented on each slot if the node 10e does not detect transmission on the CTS mini-slot of the slot, B.2. The counter K is blocked until the end of the frame if the node correctly decodes an RTS message which is intended for it, B.3. On the first "S" slots of the frame, the counter K is blocked until the end of the current frame Fc if the node 10e detects a transmission on the CTS mini-slot of the slot, MS2(s), B.4. On the slot "S+1" of the frame Fc, the counter K is blocked until the end of the next frame Fs, if the node 10e detects a transmission on the CTS mini-slot of the slot, B.5. The counter K is blocked during the slot "S+2".

Phase C

On expiry of the counter K, the node 10e transmits a message of the RTS type to notify its wish to transmit to the recipient 10r. This transmission takes place on the SIG channel, C.1. On the first mini-slot of the slot following the expiry if the counter K expires in the first "S" slots of the frame, C.2. On the first mini-slot of the first slot of the next frame Fs if the counter K expires on the slot "S+1" of the current frame Fc.

Phase D

If the recipient terminal 10r correctly receives the request to send message RTS and it is not blocked in reception, then the recipient node responds with the sending of a message of the CTS type to indicate to the transmitting node that it is available for the reception. The transmission of the CTS message takes place on the CTS mini-slot of the slot in which the transmission of the RTS message, MS2(s, RTS), took place.

Phase E

E.1. If the transmitting terminal 10e of the RTS correctly receives the CTS message, then it sends a message of CAC type on the SIG channel on the third mini-slot of the slot in which the RTS/CTS exchange, MS3(s, RTS/CTS), took place. The transmission of the data begins, on the DATA channel, on the next slot if the successful RTS/CTS exchange took place in one of the first "S" slots of the frame, or on the first slot of the next frame Fs if the RTS/CTS exchange took place on the slot "S+1" of the current frame Fc. Thus, the communication can begin on any slot of the frame on expiry of the counter and after a successful RTS/CTS exchange, but it necessarily ends at the end of the frame in which the data transmission began just before the last slot, E.2. If the transmitting terminal 10e does not correctly receive the CTS message, then it will be able to either abort the current transmission of the data, or try again to access the channel by once again following the steps of the phases C to E until the CTS message is correctly received. If the transmitting node 10e fails to receive the CTS message after a predefined number of attempts, then it aborts the current transmission of the data.

Phase F

A receiving node 10r sends, on the DATA channel on the last slot of the frame, a message of the ACK type to inform the transmitter of the DATA reception state.

Figure 5B:
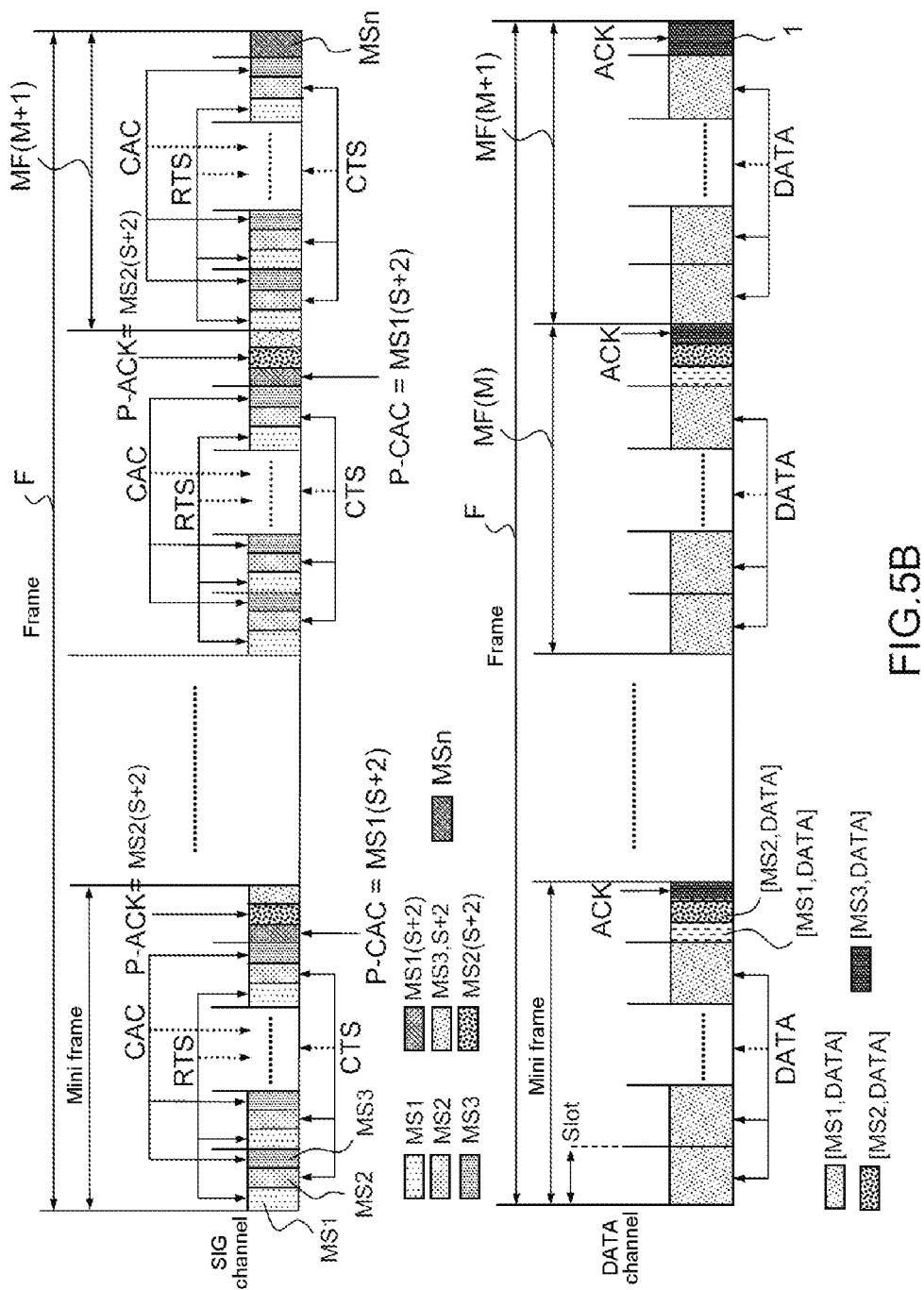

FIG. 5B schematically represents a variant of FIG. 5A in the multi-frame case with M+1 (M>=0) mini-frames. The TDMA frame of the variant described in FIG. 4B of the protocol is taken up and the frame is modified on the signalling channel in such a way that each slot of the first "S+1" slots of each mini-frame is now made up of three mini-slots: a first mini-slot MS1 for the sending of the RTS messages, a second mini-slot MS2 for the sending of the CTS messages, and a third mini-slot MS3 for the sending of a message of CAC type. The last slot S+2 of the first M mini-frames on the SIG channel is modified to contain three mini-slots: the first MS1(S+2) for the sending of the messages of P-CAC (Persistent CAC) type, the second MS2(S+2) for the sending of the messages of P-ACK type, and an unused third mini-slot MS3(S+2). The P-CAC message enables a transmitting node which has gained access to the data channel DATA on a number of mini-frames to inform its neighbourhood at the end of each mini-frame that it would continue its transmission of data on the data channel DATA during the next mini-frame. This message is not therefore sent at the end of the last mini-frame of data transmission.

The last slot S+2 of the first M mini-frames on the data channel DATA is modified to contain three mini-slots: the first two mini-slots [MS1, MS2, DATA] are not used, and the third mini-slot [MS3, DATA] is reserved for the sending of the ACK messages.

The method using this type of frames will for example comprise the steps described hereinbelow.

Phase A

A node which is not transmitting or receiving on the DATA channel listens to the SIG channel, A.1. If it detects a transmission on a CTS mini-slot (second mini-slot of the slot) of one of the first "S" slots, then it prohibits any access to the RTS mini-slots (first mini-slot of the slot) of the signalling channel SIG until the end of the current mini-frame, so it becomes a node blocked in transmission on the current mini-frame, A.2. If it detects a transmission on the CTS mini-slot of the slot "S+1", then it prohibits any access to the RTS mini-slots of the signalling channel SIG until the end of the next mini-frame, so it becomes a node blocked in transmission on the next mini-frame, A.3. If it detects the transmission on the P-ACK mini-slot of the slot "S+2", then it prohibits any access to the RTS mini-slots of the signalling channel SIG until the end of the next mini-frame, so it becomes a node blocked in transmission on the next mini-frame, A.4. If it detects a transmission on the CAC mini-slot (third mini-slot of the slot) of one of the first "S" slots, then it prohibits any access to the CTS mini-slots of the SIG channel until the end of the current mini-frame, so it becomes a node blocked in reception on the current frame, A.5. If it detects a transmission on the CAC mini-slot (third mini-slot of the slot) of the slot "S+1", then it prohibits any access to the CTS mini-slots of the signalling channel until the end of the next mini-frame, so it becomes a node blocked in reception on the next mini-frame, A.6. If it detects a transmission on the P-CAC mini-slot of the slot "S+2", then it prohibits any access to the CTS mini-slots of the signalling channel SIG until the end of the next mini-frame, so it becomes a node blocked in reception on the next mini-frame.

Phase B

A node 10e wanting to transmit draws a random number and initiates a countdown K with the value of the number drawn, B.1. The counter K is decremented on each slot if the node 10e does not detect transmission on the CTS mini-slot of the slot, B.2. The counter K is blocked until the end of the reception if the node 10e correctly decodes an RTS message which is intended for it. The end of the reception is indicated in the RTS message, B.3. On the first "S" slots of the mini-frame, the counter K is blocked until the end of the current mini-frame MFc if the node 10e detects a transmission on the CTS mini-slot of the slot, B.4. On the slot "S+1" of the mini-frame MFc, the counter K is blocked until the end of the next mini-frame MFs if the node detects a transmission on the CTS mini-slot of the slot, B.5. On the slot "S+2" of the mini-frame MFc, the counter K is blocked until the end of the next mini-frame MFs if the node detects a transmission on the P-ACK mini-slot of the slot, B.6. The counter K is blocked during the slot "S+2" of each mini-frame MF of the frame.

Phase C

On expiry of the counter K, the node 10e transmits a message of the RTS type to notify its wish to transmit to the recipient. This transmission takes place on the SIG channel, C.1. On the first mini-slot of the slot following the expiry if the counter K expires in the first "S" slots of the mini-frame, C.2. On the first mini-slot of the first slot of the next mini-frame if the counter expires on the slot "S+1" of the current mini-frame.

Phase D

If the recipient terminal correctly receives the request to send message RTS and it is not blocked in reception, then the recipient node responds with the sending of a message of the CTS type to indicate to the transmitting node that it is available for the reception. The transmission of the CTS message takes place on the second mini-slot (CTS slot) of the slot in which the transmission of the RTS message took place.

Phase E

E.1. If the transmitting terminal 10e of the RTS correctly receives the CTS message, then it sends a message of CAC type on the signalling channel SIG on the third mini-slot of the slot in which the RTS/CTS exchange took place. The transmission of the data begins, on the DATA channel, on the next slot if the successful RTS/CTS exchange took place in one of the first "S" slots of the mini-frame, or on the first slot of the next mini-frame if the RTS/CTS exchange took place on the slot "S+1" of the current mini-frame. Thus, the communication can begin on any slot of the frame on expiry of the counter and after a successful RTS/CTS exchange, and can extend over a plurality of mini-frames, but necessarily ends at the end of one of the mini-frames of the frame in which the transmission of the data began. The transmitting node indicates the last mini-frame of the transmission of the data in its RTS message.

E.2. If the transmitting terminal does not correctly receive the CTS message, then it will be able to either abort the current transmission of the data or try again to access the channel by once again following the steps of the phases C to E until the CTS message is correctly received. If the transmitting node fails to receive the CTS message after a predefined number of attempts, then it aborts the current transmission of the data.

Phase F

The transmitting node sends a P-CAC message on the SIG channel on the first mini-slot of the last slot S+2 of each of the data transmission mini-frames except for the last data transmission mini-frame.

Phase G

The recipient or receiving node sends an ACK message on the DATA channel at the end of the last data transmission mini-frame and a P-ACK message on the signalling channel on the second mini-slot of the last slot S+2 of each of the other intermediate mini-frames of the data transmission.

Figure 6A:
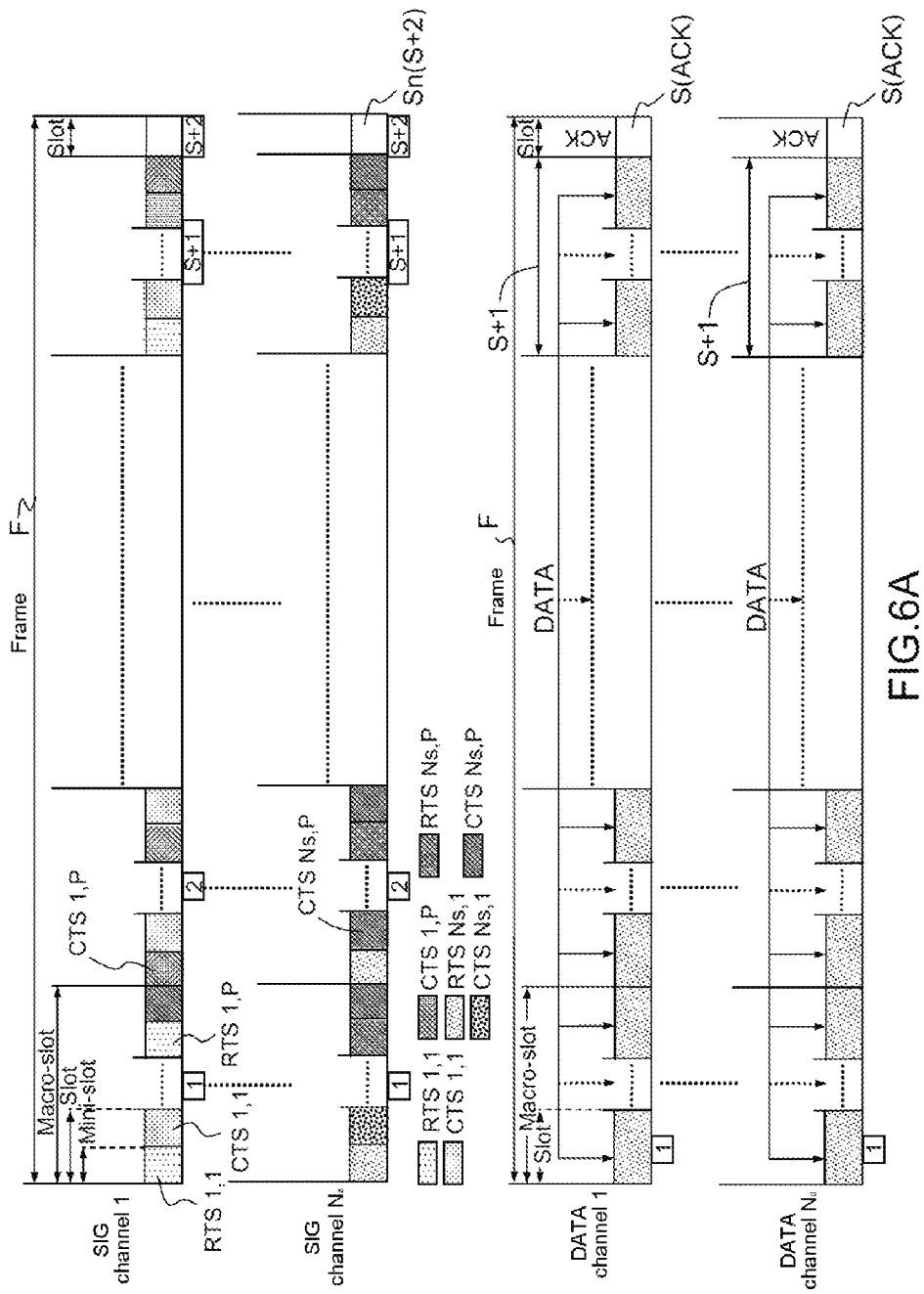

FIG. 6A schematically represents the structure of a frame in the case of a transmission on Ns signalling channels and on Nd data channels. It is now considered that the TDMA frame of the version of the protocol described in FIG. 4A is supported by "Ns+Nd" radio channels that are distinct (frequency, code, etc.): "Ns" SIG channels and "Nd" DATA channels, in which "Nd" is a multiple of "Ns": "Nd=P*Ns". It is assumed that the nodes 10n are capable of simultaneously receiving on the "Ns" SIG channels. On the SIG channels, the frame contains "S+1" RTS/CTS signalling macro-slots, [GS, SIG], and an unused last slot Sn(S+2). Each of the signalling macro-slots [GS, SIG] is made up of "P" slots, and each slot is itself made up of two mini-slots, $RTS_{n,i}$, $CTS_{n,i}$ with n being the channel number and i the slot number in a macro-slot GS. The first mini-slot $RTS_{n,i}$ transports messages of RTS type and the second mini-slot $CTS_{n,i}$ transports messages of CTS type. The "i"th slot of each macro-slot Gs on the "n"th signalling channel SIG is used for the exchange of RTS/CTS reservation signalling to access the "d"th data channel such that "d=(n−1)*P+i". On the data channels DATA, the frame contains "S+1" data macro-slots and a last acknowledgement slot ACK S(ACK). Each of the data macro-slots or DATA is itself made up of "P" data slots DATA.

By using this frame structure, the method comprises the steps described hereinbelow.

Phase A

A node which is not transmitting or receiving on a DATA channel listens to the SIG channels, A.1. If it detects a transmission on the SIG channel "n" on the CTS mini-slot of the "i"th slot $CTS_{n,i}$ of one of the first "S" macro-slots of the frame Fc, then it prohibits any access to the RTS mini-slots of the "i"th slot of the macro-slots on this signalling channel "n" until the end of the current frame, so it becomes a node blocked in transmission on the DATA channel "d=(n−1)P+i" corresponding to this signalling channel "n" and to this slot "i" until the end of the current frame, A.2. If it detects a transmission on the SIG channel "n" on the CTS mini-slot of the "i"th slot of the macro-slot "S+1" [$CTS_{n,i}$, GS(S+1)] of the frame Fc, then it prohibits any access to the RTS mini-slots of the "i"th slot of the macro-slots [$RTS_{n,i}$, GS(s)] on this signalling channel "n" until the end of the next frame Fs, so it becomes a node blocked in transmission on the DATA channel "d=(n−1)P+i" corresponding to this signalling channel "n" and to this slot "i" until the end of the next frame, A.3. If it detects a transmission on the SIG channel "n" on the RTS mini-slot [$RTS_{n,i}$, GS(s)] of the "i"th slot of one of the first "S" macro-slots of the frame, then it prohibits any access to the CTS mini-slots of the "i"th slot of the macro-slots [$CTS_{n,i}$, GS(s)] on this signalling channel "n" until the end of the current frame, so it becomes a node blocked in reception on the DATA channel "d=(n−1)P+i" corresponding to this signalling channel "n" and to this slot "i" until the end of the current frame, A.4. If it detects a transmission on the SIG channel "n" on the RTS mini-slot of the "i"th slot of the macro-slot "S+1" [$RTS_{n,i}$, GS(S+1)] of the frame Fc, then it prohibits any access to the CTS mini-slots of the "i"th slot of the macro-slots [$CTS_{n,i}$, GS(s)] on this signalling channel "n" until the end of the next frame, so it becomes a node blocked in reception on the DATA channel "d=(n−1)P+i" corresponding to this signalling channel "n" and to this slot "i" until the end of the next frame.

Phase B

A node 10e wanting to transmit draws a random number and initiates a countdown K with the value of the number drawn. The node 10e permanently listens simultaneously to all the signalling channels SIG. On each signalling channel "n", B.1. The counter K is decremented on each slot s of the signalling SIG macro-slots GS(s) if the node does not detect transmission on the CTS mini-slot of the slot, B.2. On the first "S" macro-slots of the frame, the counter K is blocked and the node 10e is blocked in transmission on the signalling channel "n" and on the slot "i" of each macro-slot until the end of the current frame Fc if the node detects a transmission on the CTS mini-slot of the slot "i". The node is blocked in transmission on the corresponding DATA channel "d=(n−1)P+i" until the end of the current frame, B.3. On the macro-slot "S+1", GS(S+1), the counter K is blocked and the node 10e is blocked in transmission on the signalling channel "n" and on the slot "i" of each macro-slot until the end of the next frame if the node 10e detects a transmission on the CTS mini-slot of the slot "i". The node 10e is blocked in transmission on the corresponding DATA channel "d=(n−1)P+i" until the end of the next frame, B.4. The counter K is blocked during the last slot of the frame Fc.

Phase C

On expiry of the counter K, the node 10e transmits a message of the RTS type to notify its wish to transmit to the recipient 10r. This transmission takes place on the slot "i" and the signalling channel "n" corresponding to the DATA channel "d=(n−1)P+i" chosen randomly by the transmitting node 10e from the DATA channels on which it is not blocked in transmission. The transmission takes place:

C.1. On the macro-slot following the expiry if the counter expires in the first "S" macro-slots of the frame, C.2. On the first macro-slot of the next frame Fs if the counter expires on the macro-slot "S+1" of the current frame Fc.

Phase D

If the recipient 10r correctly receives the RTS message on the slot $RTS_{n,i}$ and it is not blocked in reception on the DATA channel "d=(n−1)P+i" corresponding to the slot "i" and to the SIG channel "n" used for the sending of the RTS message, then it responds with the sending of a CTS message on the second mini-slot $CTS_{n,i}$ of the slot "i" in which the transmission of the RTS message took place and on the same SIG channel "n" in which the transmission of the RTS took place to indicate to the transmitting node that it is available for the reception.

Phase E

E.1. If the transmitting node 10e correctly receives the CTS message, then the transmission of the data takes place on the DATA channel "d=(n−1)P+i" corresponding to the slot "i" and to the signalling channel "n" used for the exchange of the RTS/CTS messages. The transmission of the data begins on the next slot (s+1) if the RTS/CTS exchange took place in one of the first "P−1" slots s of the current macro-slot $GS_c$, or on the first slot of the next macro-slot $GS_{c+1}$ if the RTS/CTS exchange took place on the slot "P" of the current macro-slot $GS_c$. The communication can begin on any slot s of the frame Fc or Fs on expiry of the counter K and after a successful RTS/CTS exchange, but necessarily ends at the end of the frame Fc or Fs in which the data transmission began just before the acknowledgement slot, ACK, S(ACK).

E.2. If the transmitting terminal 10e does not correctly receive the CTS message, then it will be able to either abort the current transmission of the data or try again to access the channel by once again following the steps of the phases C to E until the CTS message is correctly received. If the transmitting node 10e fails to receive the CTS message after a predefined number of attempts, then it aborts the current transmission of the data.

Phase F

A receiving node 10r sends, on the DATA channel on which its reception took place on the last slot of the frame, a message of the ACK type to inform the transmitter of the state of reception of the DATA.

Figure 6B:
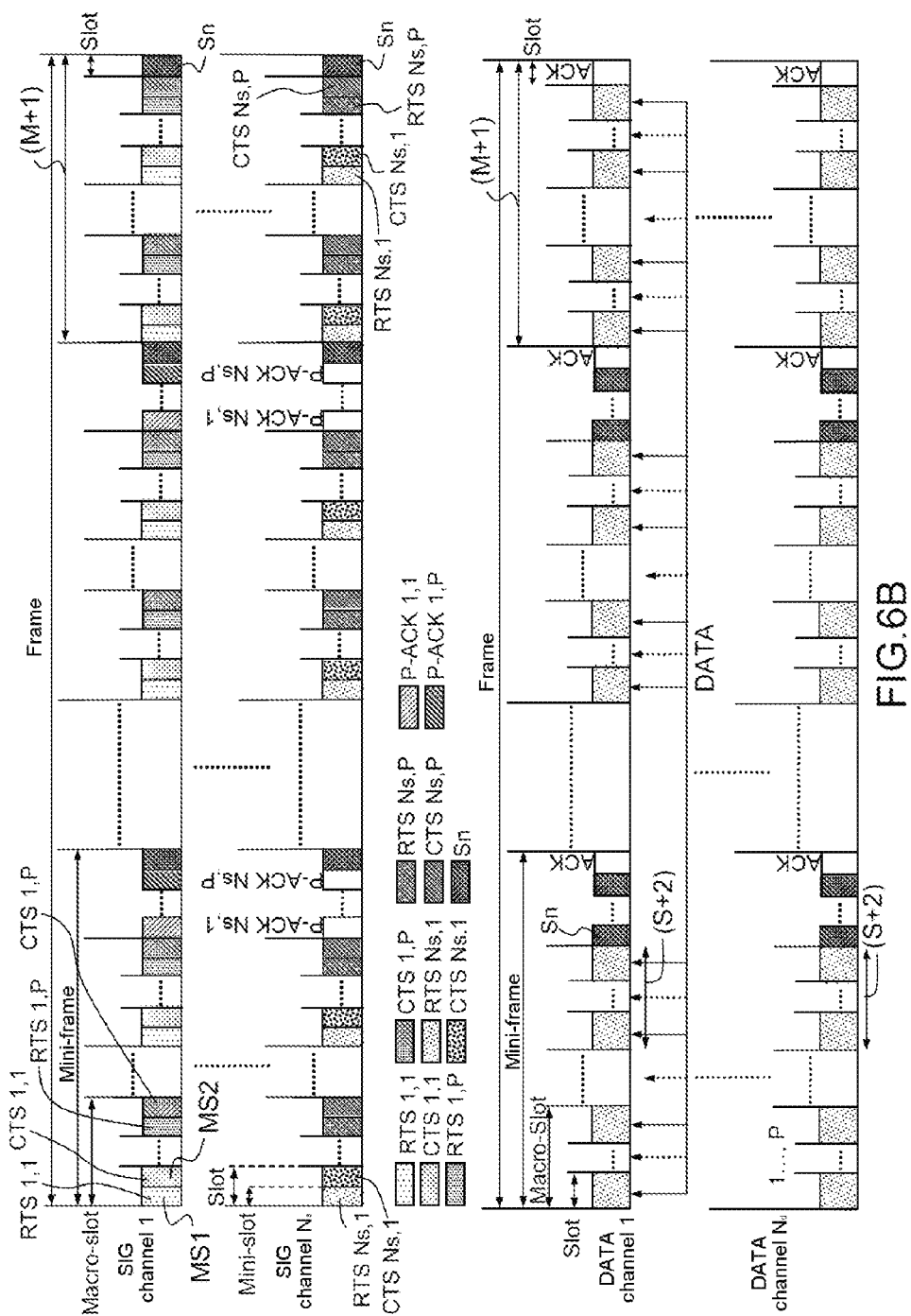

FIG. 6B represents a variant frame similar to that of FIG. 6A in the case of multi-frames MF. It is now considered that the TDMA frame of the multi-frames MF version of the protocol is supported by "Ns+Nd" radio channels that are distinct (frequency, code, etc.): "Ns" SIG (signalling) channels and "Nd" DATA (data) channels, where "Nd" is a multiple of "Ns": "Nd=P*Ns". It is assumed that the nodes $10n$ are capable of simultaneously receiving on the "Ns" SIG channels. On the SIG channels, the frame is divided into "M+1" (M>=0) mini-frames. The first "M" mini-frames MFi are optional, the last mini-frame MF (M+1) is mandatory and takes on the exact form of the SIG frame of the variant of FIG. 6A. On the SIG channels, each of the first "M" mini-frames MF is made up of "S+2" macro-slots GS: "S+1" RTS/CTS signalling macro-slots GS(RTS/CTS) and a last P-ACK signalling macro-slot, GS(P-ACK). Each of the "S+1" RTS/CTS signalling macro-slots is made up of "P" slots, and each of the "P" slots is itself made up of two mini-slots, MS1=$RTS_{n,i}$, MS2=$CTS_{n,i}$ with n being the signalling channel number and i the number or position of the slot in a macro-slot. The first mini-slot $RTS_{n,i}$ transports messages of RTS type and the second mini-slot $CTS_{n,i}$ transports messages of CTS type. The P-ACK signalling macro-slot GS(P-$ACK_{n,i}$) is made up of "P" slots which transport messages of P-ACK type and an unused last slot Sn. The last mini-frame MF(M+1) takes the construction of the first "M" frames except for the last macro-slot which now contains only a single unused slot [Sn, MF(M+1)]. The "i"th slot of each macro-slot GS of each mini-frame MF on the "n"th SIG channel is used for the exchange of RTS/CTS reservation signalling to access the "d"th DATA channel such that "d=(n−1)*P+i". The "i"th slot of the last P-ACK macro-slot, GS(P-$ACK_{n,i}$) of each mini-frame MF on the "n"th SIG channel is used for the sending of P-ACK messages corresponding to the DATA channel "d" such that "d=(n−1)*P+i". On the DATA channels, the frame also contains "M+1" (M>=0) mini-frames MF. The first "M" mini-frames are optional, the last mini-frame is mandatory and takes on the exact form of the DATA frame of the FIG. 6A variant. On the DATA channels, each of the first "M" mini-frames MF is made up of "S+2" macro-slots: "S+1" DATA macro-slots and a last ACK signalling macro-slot. Each of the "S+1" DATA macro-slots is made up of P data slots. The ACK signalling macro-slot is made up of "P" unused slots Sn and a last ACK slot to transport messages of ACK type. The last mini-frame MF(M+1) takes the construction of the first "M" except for the last macro-slot [GS(M+1), ACK] which now contains only a single ACK slot to transport messages of ACK type.

With this frame structure, the method comprises the following steps.

Phase A

A node which is not transmitting or receiving on a DATA channel listens to the SIG channels, A.1. If it detects a transmission on the signalling channel "n" on the CTS mini-slot $CTS_{n,i}$ of the "i"th slot of one of the first "S" macro-slots GS of the current mini-frame MFc, then it prohibits any access to the RTS mini-slots of the "i"th slot, $RTS_{n,i}$ of the macro-slots GS on this signalling channel SIG "n" until the end of the current mini-frame MFc, so it becomes a node blocked in transmission on the DATA channel "d=(n−1)P+i" corresponding to this signalling channel "n" and to this slot "i" until the end of the current mini-frame MFc, A.2. If it detects a transmission on the signalling channel "n" on the CTS mini-slot of the "i"th slot of the macro-slot "S+1" [$CTS_{n,i}$, GS(S+1)] of the mini-frame MFc, then it prohibits any access to the RTS mini-slots of the "i"th slot, $RTS_{n,i}$ of the macro-slots on this signalling channel until the end of the next mini-frame MFs=$MF_{c+1}$, so it becomes a node blocked in transmission on the DATA channel "d=(n−1)P+i" corresponding to this signalling channel "n" and to this slot "i" until the end of the next mini-frame, A.3. If it detects a transmission on the signalling channel "n" on the P-ACK slot "i" of the macro-slot "S+2" [P-$ACK_{n,i}$, GS(S+2)] of the mini-frame MFc, then it prohibits any access to the RTS mini-slots of the "i"th slot, $RTS_{n,i}$ of the macro-slots on this signalling channel until the end of the next mini-frame MFs, so it becomes a node blocked in transmission on this DATA channel "d=(n−1)P+i" corresponding to this signalling channel "n" and to this slot "i" until the end of the next mini-frame, A.4. If it detects a transmission on the signalling channel "n" on the RTS mini-slot of the "i"th slot of one of the first "S" macro-slots of the mini-frame, [$RTS_{n,i}$, GS(s)], then it prohibits any access to the CTS mini-slots of the "i"th slot of the macro-slots [$CTS_{n,i}$, GS(s)] on this signalling channel SIG until the end of the current mini-frame MFc, so it becomes a node blocked in reception on the DATA channel "d=(n−1)P+i" corresponding to this signalling channel "n" and to this slot "n" until the end of the current mini-frame MFc, A.5. If it detects a transmission on the signalling channel "n" on the RTS mini-slot of the "i"th slot of the macro-slot "S+1" [$RTS_{n,i}$, GS(S+1)] of the mini-frame MFc, then it prohibits any access to the CTS mini-slots of the "i"th slot of the macro-slots [$CTS_{n,i}$, GS(s)] on this SIG channel until the end of the next mini-frame MFs, so it becomes a node blocked in reception on the DATA channel "d=(n−1)P+i" corresponding to this signalling channel "n" and to this slot "i" until the end of the next mini-frame.

Phase B

A node $10e$ wanting to transmit draws a random number and initiates a countdown, K, with the value of the number drawn. The node permanently listens simultaneously to all the SIG channels. On each signalling channel "n", B.1. The counter K is decremented on each slot of the signalling macro-slots if the node $10e$ does not detect transmission on the CTS mini-slot of the slot, B.2. On the first "S" macro-slots GS of the mini-frame MFc, the counter K is blocked and the node $10e$ is blocked in transmission on the signalling channel "n" and on the slot "i" until the end of the current mini-frame MFc if the node detects a transmission on the CTS mini-slot of the slot "i". The node $10e$ is blocked in transmission on the corresponding DATA channel "d=(n−1)P+i" until the end of the current mini-frame MFc, B.3. On the macro-slot "S+1" the counter K is blocked and the node $10e$ is blocked in transmission on the signalling channel "n" and on the slot "i" until the end of the next mini-frame if the node $10e$ detects a transmission on the CTS mini-slot of the slot "i". The node $10e$ is blocked in transmission on the corresponding DATA channel "d=(n−1) P+i", until the end of the next mini-frame MFs, B.4. On the macro-slot "S+2", the counter K is blocked and the node $10e$ is blocked in transmission on the signalling channel "n" and on the slot "i" until the end of the next mini-frame if the node $10e$ detects a transmission on the P-ACK slot "i". The node $10e$ is blocked in transmission on the corresponding DATA channel "d=(n−1)P+i", until the end of the next mini-frame MFs, B.5. The counter K is blocked during the last slot of each frame F.

Phase C

On expiry of the counter K, the node $10e$ transmits a message of the RTS type to notify its wish to transmit to the recipient. This transmission takes place on the slot "i" and the signalling channel "n" corresponding to the DATA channel "d=(n−1)P+i" chosen randomly by the transmitting node from the DATA channels on which it is not blocked in transmission. The transmission takes place, C.1. On the macro-slot following the expiry if the counter K expires in the first "S" macro-slots of the mini-frame, C.2. On the first macro-slot of the next mini-frame if the counter K expires on the macro-slot "S+1" of the current mini-frame.

Phase D

If the recipient 10r correctly receives the RTS message on the slot $RTS_{n,i}$ and it is not blocked in reception on the DATA channel "d=(n−1)P+i" corresponding to the slot "i" and to the SIG channel "n" used for the sending of the RTS message, then it responds with the sending of a CTS message on the second mini-slot $CTS_{n,i}$ of the slot in which the transmission of the RTS message took place and on the same SIG channel on which the transmission of the RTS took place to indicate to the transmitting node that it is available for the reception.

Phase E

E.1. If the transmitting node 10e correctly receives the CTS message, then the transmission of the DATA takes place on the DATA channel "d=(n−1)P+i" corresponding to the slot "i" and to the SIG signalling channel "n" used for the exchange of the RTS/CTS messages. The transmission of the data begins, E.1.a On the next slot if the RTS/CTS exchange took place in a slot of the first "S" macro-slots of the current mini-frame MFc, E.1.b On the next slot if the RTS/CTS exchange took place in one of the "P−1" slots of the macro-slot "S+1" of the current mini-frame MFc, E.1.c On the first slot of the first macro-slot of the next mini-frame MFs if the RTS/CTS exchange took place on the slot "P" of the macro-slot "S+1" of the current mini-frame MFc.

Thus, the communication can begin on any slot of the frame on expiry of the counter K and after a successful RTS/CTS exchange, and can extend over a plurality of mini-frames, but necessarily ends at the end of one of the mini-frames of the frame in which the transmission of the data began. The transmitting nodes indicates the last mini-frame of the transmission of the data in its RTS message.

E.1.f. If the transmitting terminal 10e does not correctly receive the CTS message, then it will be able to either abort the current transmission of the data, or try again to access the channel by once again following the steps from C to E until the CTS message is correctly received. If the transmitting node fails to receive the CTS message after a predefined number of attempts, then it aborts the current transmission of the data.

Phase F

The receiving node 10r sends an acknowledgement message ACK on the DATA channel used for the transmission of the data at the end of the last transmission mini-frame, and a P-ACK message on the SIG channel "n" and on the P-ACK slot "i", corresponding to the DATA channel "d=(n−1)P+i" used for the transmission of the data, used at the end of each of the other intermediate mini-frames of the transmission.

Figure 7A:
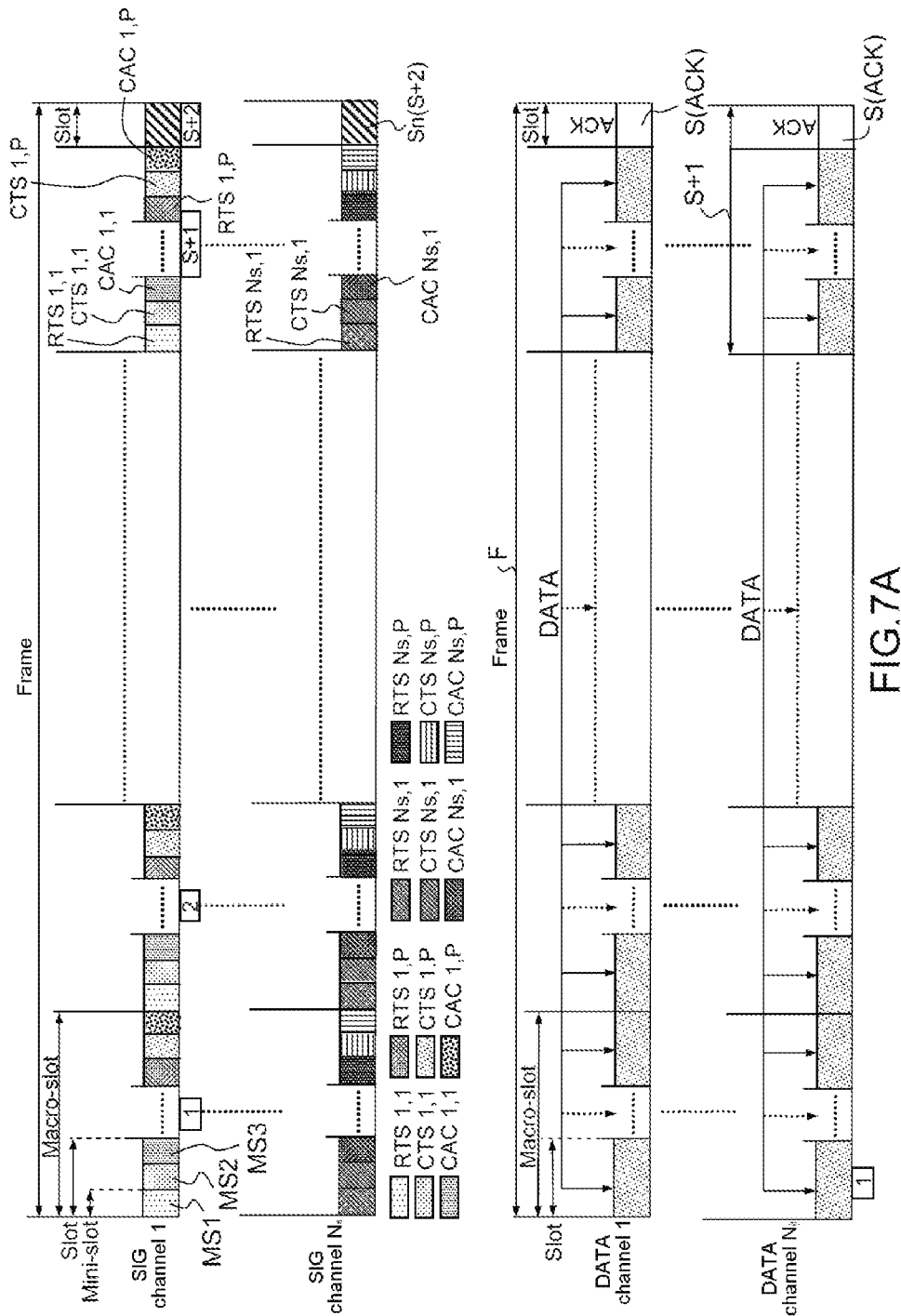

FIG. 7A represents a frame structure for 'Ns' SIG channels and 'Nd' DATA channels that are distinct with a validation of the RTS. The TDMA frame of the FIG. 6A variant of the protocol is taken up and the frame is modified on the signalling channels SIG in such a way that each slot s of the macro-slots GS is now made up of three mini-slots: a first mini-slot MS1 for the sending of the RTS messages, a second mini-slot MS2 for the sending of the CTS messages, and a third mini-slot MS3 for the sending of a message of CAC type.

Phase A

A node which is not transmitting or receiving on a DATA channel listens to the SIG channels, A.1. If it detects a transmission on the SIG channel "n" on the CTS mini-slot of the "i"th slot of one of the first "S" macro-slots of the frame Fc, $[CTS_{n,i}, GS]$, then it prohibits any access to the RTS mini-slots $[RTS_{n,i}, GS]$ of the "i"th slot of the macro-slots on this signalling channel SIG "n" until the end of the current frame Fc, so it becomes a node blocked in transmission on the DATA channel "d=(n−1)P+i" corresponding to this signalling channel "n" and to this slot "i" until the end of the current frame Fc, A.2. If it detects a transmission on the SIG channel "n" on the CTS mini-slot of the "i"th slot of the macro-slot "S+1" $[CTS_{n,i}, GS(S+1)]$ of the frame Fc, then it prohibits any access to the RTS mini-slots of the "i"th slot of the macro-slots on this signalling channel "n" until the end of the next frame Fs, so it becomes a node blocked in transmission on the DATA channel "d=(n−1)P+i" corresponding to this signalling channel "n" and to this slot "i" until the end of the next frame, A.3. If it detects a transmission on the SIG channel "n" on the CAC mini-slot of the "i"th slot of one of the first "S" macro-slots, $[CAC_{n,i}, GS(S)]$, of the frame Fc, then it prohibits any access to the CTS mini-slots of the "i"th slot of the macro-slots $[CTS_{n,i}, GS(S)]$ on this SIG channel "n" until the end of the current frame Fc, so it becomes a node blocked in reception on the DATA channel "d=(n−1)P+i" corresponding to this signalling channel "n" and to this slot "i" until the end of the current frame Fc, A.4. If it detects a transmission on the SIG channel "n" on the CAC mini-slot of the "i"th slot of the macro-slot "S+1" $[CAC_{n,i}, GS(S+1)]$ of the frame Fc, then it prohibits any access to the CTS mini-slots of the "i"th slot of the macro-slots $[CTS_{n,i}, GS(S)]$ on this SIG channel "n" until the end of the next frame, so it becomes a node blocked in reception on the DATA channel "d=(n−1)P+i" corresponding to this signalling channel "n" and to this slot "i" until the end of the next frame.

Phase B

A node wanting to transmit draws a random number K and initiates a countdown with the value of the number drawn. The node permanently listens simultaneously to all the signalling channels SIG. On each signalling channel "n", B.1. The counter K is decremented on each slot s of the signalling macro-slots GS if the node 10e does not detect transmission on the CTS mini-slot of the slot, B.2. On the first "S" macro-slots of the frame Fc, the counter K is blocked and the node 10e is blocked in transmission on the signalling channel SIG "n" and on the slot "i" until the end of the current frame Fc if the node 10e detects a transmission on the CTS mini-slot of the slot "i". The node is blocked in transmission on the corresponding DATA channel "d=(n−1)P+i" until the end of the current frame, B.3. On the macro-slot "S+1", the counter K is blocked and the node 10e is blocked in transmission on the signalling channel "n" and on the slot "i" until the end of the next frame Fs if the node 10e detects a transmission on the CTS mini-slot of the slot "i". The node 10e is blocked in transmission on the corresponding DATA channel "d=(n−1)P+i" until the end of the next frame Fs, B.4. The counter K is blocked during the last slot of the frame Fc.

Phase C

On expiry of the counter K the node 10e transmits a message of the RTS type to notify its wish to transmit to the recipient. This transmission takes place on the slot "i" and the signalling channel "n" corresponding to the DATA channel "d=(n−1)P+i" chosen randomly by the transmitting node from the DATA channels on which it is not blocked in transmission. The transmission takes place, C.1. On the macro-slot following the expiry if the counter expires in the first "S" macro-slots of the frame, C.2. On the first macro-slot of the next frame if the counter expires on the macro-slot "S+1" of the frame.

Phase D

If the recipient 10r correctly receives the RTS message and is not blocked in reception on the DATA channel "d=(n−1)P+i" corresponding to the slot "i" and to the SIG channel "n" used for the sending of the RTS message, then it responds with the sending of a CTS message on the second mini-slot $CTS_{n,i}$ of the slot in which the transmission of the RTS message took place and on the same SIG channel "n" on which the transmission of the RTS took place to indicate to the transmitting node that it is available for the reception.

Phase E

E.1. If the transmitting node 10e correctly receives the CTS message, then it sends a message of CAC type on the third mini-slot $CAC_{n,i}$ of the slot in which the RTS/CTS exchange took place. The transmission of the DATA takes place on the DATA channel "d=(n−1)P+i" corresponding to the slot and to the signalling channel used for the exchange of the RTS/CTS messages. The transmission of the data begins on the next slot if the RTS/CTS exchange took place in one of the first "P−1" slots of the current macro-slot, or on the first slot of the next macro-slot if the RTS/CTS exchange took place on the slot "P" of the current macro-slot GSc. The communication can begin on any slot of the frame on expiry of the counter and after a successful RTS/CTS exchange, but necessarily ends at the end of the frame in which the DATA transmission began just before the ACK slot, E.2. If the transmitting terminal does not correctly receive the CTS message, then it will be able to either abort the current transmission of the data or try again to access the channel by once again following the steps of the phases C to E until the CTS message is correctly received. If the transmitting node fails to receive the CTS message after a predefined number of attempts, then it aborts the current transmission of the data.

Phase F

A receiving node sends, on the DATA channel on which its reception took place, on the last slot of the frame, a message of the ACK type to inform the transmitter of the state of reception of the data.

Figure 7B:
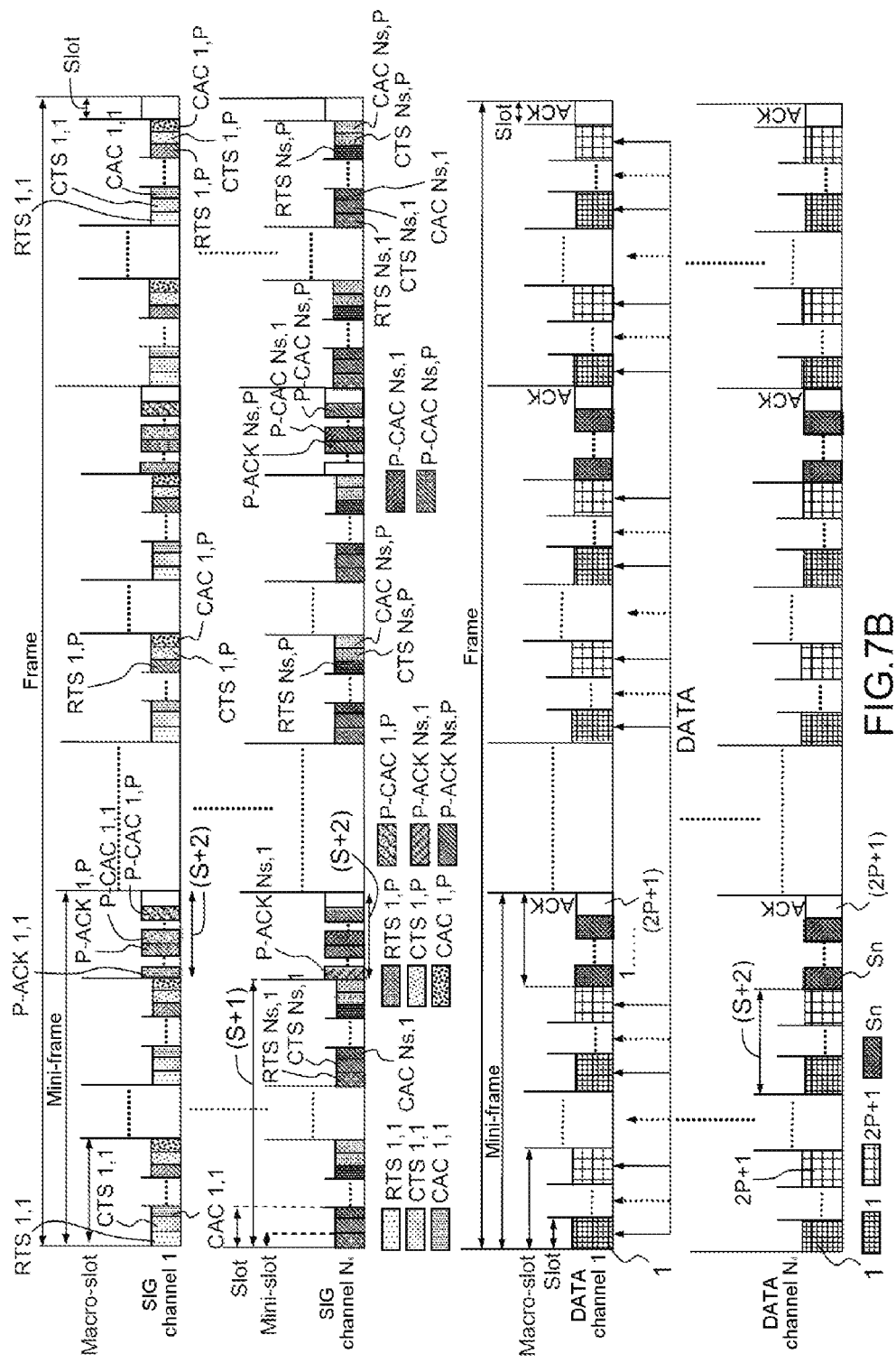

FIG. 7B is a variant of the multi-frame structure of FIG. 7A. The TDMA frame of the 6.B variant of the protocol is taken up and the frame is modified on the SIG channels in such a way that each slot of the first "S+1" macro-slots of each mini-frame is now made up of three mini-slots: a first mini-slot for the sending of the RTS messages, a second mini-slot for the sending of the CTS messages, and a third mini-slot for the sending of a message of CAC type. The last macro-slot S+2 of the first M mini-frames on the SIG channels is now made up of 2P+1 slots: P P-CAC slots, P P-ACK slots, and an unused last slot. The last macro-slot S+2 of the first M mini-frames on the DATA channels is modified to contain 2P+1 slots: 2P unused slots and a last ACK slot.

Phase A

A node which is not transmitting or receiving on a DATA channel listens to the signalling channels SIG.

A.1. If it detects a transmission on the SIG channel "n" on the CTS mini-slot of the "i"th slot of one of the first "S" macro-slots of the current mini-frame, then it prohibits any access to the RTS mini-slots of the "i"th slot of the macro-slots on this signalling channel until the end of the current mini-frame, so it becomes a node blocked in transmission on the DATA channel "d=(n−1)P+i" corresponding to this signalling channel "n" and to this slot "i" until the end of the current mini-frame, A.2. If it detects a transmission on the SIG channel "n" on the CTS mini-slot of the "i"th slot of the macro-slot "S+1" of the current mini-frame, then it prohibits any access to the RTS mini-slots of the "i"th slot of the macro-slots on this signalling channel until the end of the next mini-frame, so it becomes a node blocked in transmission on the DATA channel "d=(n−1)P+i" corresponding to this signalling channel "n" and to this slot "i" until the end of the next mini-frame, A.3. If it detects a transmission on the signalling channel "n" on the P-ACK slot "i" of the macro-slot "S+2" of the current mini-frame, then it prohibits any access to the RTS mini-slots of the "i"th slot of the macro-slots on this signalling channel until the end of the next mini-frame, so it becomes a node blocked in transmission on the DATA channel "d=(n−1)P+i" corresponding to this signalling channel "n" and to this slot "i" until the end of the next mini-frame, A.4. If it detects a transmission on the SIG channel "n" on the CAC mini-slot of the "i"th slot of one of the first "S" macro-slots of the current mini-frame, then it prohibits any access to the CTS mini-slots of the "i"th slot of the macro-slots on this signalling channel until the end of the current mini-frame, so it becomes a node blocked in reception on the DATA channel "d=(n−1)P+i" corresponding to this signalling channel "n" and to this slot "i" until the end of the current mini-frame, A.5. If it detects a transmission on the SIG channel "n" on the CAC mini-slot of the "i"th slot of the macro-slot "S+1" of the current mini-frame, then it prohibits any access to the CTS mini-slots of the "i"th slot of the macro-slots on this signalling channel until the end of the next mini-frame, so it becomes a node blocked in reception on the DATA channel "d=(n−1)P+i" corresponding to this signalling channel "n" and to this slot "i" until the end of the next mini-frame, A.6. If it detects a transmission on the SIG channel "n" on the P-CAC slot "i" of the macro-slot "S+2" of the current mini-frame, then it prohibits any access to the CTS mini-slots of the "i"th slot of the macro-slots on this signalling channel until the end of the next mini-frame, so it becomes a node blocked in reception on the DATA channel "d=(n−1)P+i" corresponding to this signalling channel "n" and to this slot "i" until the end of the next mini-frame.

Phase B

A node wanting to transmit draws a random number and initiates a countdown K with the value of the number drawn. The node permanently listens simultaneously to all the SIG channels. On each signalling channel "n", B.1. The counter K is decremented on each slot of the signalling macro-slots if the node does not detect transmission on the CTS mini-slot of the slot, B.2. On the first "S" macro-slots of the mini-frame, the counter is blocked and the node is blocked in transmission on the signalling channel "n" and on the slot "i" until the end of the current frame if the node detects a transmission on the CTS mini-slot of the slot "i". The node is blocked in transmission on the corresponding DATA channel "d=(n−1)P+i" until the end of the current frame, B.3. On the macro-slot "S+1", the counter is blocked and the node is blocked in transmission on the signalling channel "n" and on the slot "i" until the end of the next mini-frame if the node detects a transmission on the CTS mini-slot of the slot "i". The node is blocked in transmission on the corresponding DATA channel "d=(n−1)P+i" until the end of the next mini-frame, B.4. On the macro-slot "S+2", the counter is blocked and the node is blocked in transmission on the signalling channel "n" and on the slot "i" until the end of the next mini-frame if the node detects a transmission on the P-ACK slot "i". The node is blocked in transmission on the corresponding DATA channel "d=(n−1)P+i" until the end of the next mini-frame, B.5. The counter is blocked during the last slot of each frame.

Phase C

On expiry of the counter K, the node transmits a message of the RTS type to notify its wish to transmit to the recipient. This transmission takes place on the slot "i" and the signalling channel "n" corresponding to the DATA channel "d=(n−1)P+i" chosen randomly by the transmitting node from the DATA channels on which it is not blocked in transmission. The transmission takes place, C.1. On the macro-slot following the expiry if the counter expires in the first "S" macro-slots of the mini-frame, C.2. On the 1st macro-slot of the next mini-frame if the counter expires on the macro-slot "S+1" of the mini-frame.

Phase D

If the recipient correctly receives the RTS message and if it is not blocked in reception on the DATA channel "d=(n−1)P+i" corresponding to the slot "i" and to the SIG channel "n" used for the sending of the RTS message, then it responds with the sending of a CTS message on the second mini-slot $CTS_{n,i}$ of the slot "i" in which the transmission of the RTS message took place and on the same SIG channel "n" on which the transmission of the RTS took place to indicate to the transmitting node that it is available for the reception.

Phase E

E.1. If the transmitting node correctly receives the CTS message, then it sends a message of CAC type on the third mini-slot $CAC_{n,i}$ of the slot "i" on which the RTS/CTS exchange took place. The transmission of the DATA takes place on the DATA channel "d=(n−1)P+i" corresponding to the slot "i" and to the signalling channel "n" used for the exchange of the RTS/CTS messages. The transmission of the data begins, E.1.a. On the next slot if the RTS/CTS exchange took place in a slot of the first "S" macro-slots of the mini-frame, E.1.b. On the next slot if the RTS/CTS exchange took place in one of the "P−1" slots of the macro-slot "S+1" of the mini-frame, E.1.c. On the first slot of the first macro-slot of the next mini-frame if the RTS/CTS exchange took place on the slot "P" of the macro-slot "S+1" of the mini-frame.

Thus, the communication can begin on any slot of the frame on expiry of the counter and after a successful RTS/CTS exchange, and can extend over a plurality of mini-frames, but necessarily ends at the end of one of the mini-frames of the frame in which the transmission of the data began. The transmitting node indicates the last mini-frame of the transmission of the DATA in its RTS message.

E.2. If the transmitting terminal does not correctly receive the CTS message, then it will be able to either abort the current transmission of the data or try again to access the channel by once again following the steps of the phases C to E until the CTS message is correctly received. If the transmitting node fails to receive the CTS message after a predefined number of attempts, then it aborts the current transmission of the data.

Phase F

The transmitting node sends a P-CAC message on the SIG channel "n" and on the P-CAC slot "i" of the last slot S+2 of each of the data transmission mini-frames except for the last data transmission mini-frame. The SIG channel "n" and the slot "i" correspond to the DATA channel "d=(n−1)P+i" used for the transmission of the data.

Phase G

The receiving node 10r sends an acknowledgement message ACK on the DATA channel used for the transmission of the data at the end of the last mini-frame of transmission, and a P-ACK message on the SIG channel "n" and on the P-ACK slot "i" corresponding to the DATA channel "d=(n−1)P+i" used for the transmission of the data used at the end of each of the other intermediate mini-frames of the transmission.

REFERENCES

[1] G. Bianchi, "Performance analysis of the ieee 802.11 distributed coordination function", IEEE Journal on Selected Area in Communications, vol. 18, 2000.

[2] H. Anouar, C. Bonnet, 'Optimal Constant-Window Backoff Scheme for IEEE 802.11 DCF in General Load Single-Hop Wireless Networks', 9-th ACM/IEEE International Symposium on Modeling, Analysis and Simulation of Wireless and Mobile Systems MSWIM 2006.

The invention claimed is:

1. A method for accessing a radio channel in a communication system comprising a plurality of terminals communicating with one another by radio links, a terminal being equipped with a transmission and/or a reception device, and a processor suitable for executing the steps of the method, and the method comprising for communication between at least two terminals:

transmitting with at least one terminal using an access protocol with a communication frame comprising a plurality of slots S(1), . . . , S(S+2), the transmitting with the at least one terminal using a first mini-slot MS1 to send data signalling message RTS or data, the transmitting with the at least one terminal using a second mini-slot MS2 comprising a "ready to receive" signalling message, CTS, or data, the transmitting with the at least one terminal using a slot (S+1) containing a message of RTS type or data, and the transmitting with the at least one terminal using a slot (S+2) containing a message of CTS type and an acknowledgement message placed at the end of the frame in order to acknowledge one or more transmissions taking place on the radio channel.

2. The method for accessing a radio channel according to claim 1, wherein a frame F is divided into (M+1) mini-frames MF, each mini-frame MF having the structure of the frame of claim 1 and for the first M mini-frames, the first mini-slot MS1 of the slot (S+2) contains a CTS message or a partial acknowledgement message P-ACK.

3. A method for accessing a radio channel in a communication system comprising a plurality of terminals communicating with one another by radio links, a terminal being equipped with a transmission device and/or a reception device, and a processor suitable for executing the steps of the method according to claim 1,
wherein it implements at least one signalling channel SIG distinct a data channel DATA,
wherein for communication between at least two terminals it uses a communication frame made up of a plurality of slots S(1), . . . (S+2), and
wherein the SIG channel is composed of RTS signalling mini-slots, [MS1, SIG] and CTS [MS2, SIG] organized in S+1 slots,
the DATA channel is composed of the S+1 data slots DATA, [S, DATA], and the last ACK slot S+2 of the DATA channel, the last slot S+2 on the SIG channel is not used, the S+1 signalling slots of the SIG channel corresponding to the S+1 data slots of the DATA channel, the unused last slot on the signalling channel SIG corresponding to the ACK slot of the DATA channel.

4. The method for accessing a radio channel according to claim 3, using at least one signalling channel distinct from a data channel, and in that a frame is divided into (M+1) mini-frames MF and in that the last mini-frame MF(M+1) has the structure of the frame of claim 3, and wherein:
for the SIG channel, the first M mini-frames are used, each made up of (S+2) slots, the (S+1) slots being each made up of a mini-slot for the RTS messages and a mini-slot for the CTS messages, the last slot contains a mini-slot for the partial acknowledgement messages P-ACK and a neutralized mini-slot,
on the DATA channel, the first M mini-frames are used, each made up of S+2 slots, the S+1 first slots are for data messages, the last slot S+2 is made up of a neutralized mini-slot and a mini-slot for the acknowledgement messages ACK.

5. The method according to claim 3, wherein the frame F on the signalling channel SIG is made up of, at the level of the first "S+1" slots, three mini-slots distributed as follows: a first mini-slot MS1 for the sending of the RTS messages, a second mini-slot MS2 for the sending of the messages of CTS type, and a third mini-slot MS3 for the sending of the messages of CAC type.

6. The method according to claim 4, using a frame made up, at the level of the first "S+1" slots of each mini-frame MF on the signalling channel, of three mini-slots distributed as follows: a first mini-slot MS1 for the sending of the RTS messages, a second mini-slot MS2 for the sending of the messages of CTS type, a third mini-slot MS3 for the sending of the messages of CAC type, the last slot (S+2) of the first M mini-frames on the signalling channel SIG is modified to contain three mini-slots: the first [MS1(S+2), SIG] for the sending of the messages of P-CAC type, the second [MS2 (S+2), SIG] for the sending of the messages of P-ACK type, and the third mini-slot [MS3(S+2), SIG] unused, the last slot S+2 of the first M mini-frames on the data channel DATA is modified to contain three mini-slots: the first two mini-slots are not used MS1, MS2, and the third mini-slot [MS3(S+2), DATA] is reserved for the sending of the ACK messages.

7. The method according to claim 3, wherein a frame F is used that is supported by "Ns+Nd" radio channels that are distinct (frequency, code, etc.): "Ns" SIG channels and "Nd" DATA channels, in which "Nd" is a multiple of "Ns": "Nd=P*Ns",
on the SIG channels, the frame contains "S+1" RTS/CTS signalling macro-slots and an unused last slot, each of the signalling macro-slots is made up of "P" slots, and each slot is itself made up of two mini-slots,
the first mini-slot transports messages of RTS type and the second mini-slot transports messages of CTS type,
the "i"th slot of each macro-slot on the "n"th signalling channel is used for the exchange of RTS/CTS reservation signalling for accessing the "d"th data channel such that "d=(n−1)*P+i",
on the DATA channels, the frame contains "S+1" DATA macro-slots and a last acknowledgement slot ACK, each of the DATA macro-slots is itself made up of "P" DATA slots.

8. The method according to claim 7, wherein a frame is used that is supported by "Ns+Nd" radio channels that are distinct (frequency, code, etc.): "Ns" SIG channels and "Nd" DATA channels, in which "Nd" is a multiple of "Ns": "Nd=P*Ns",
on the SIG channels, the frame is divided into "M+1" (M >=0) mini-frames, the last mini-frame takes on the exact form of the SIG frame of claim 7,
on the SIG channels, each of the first "M" mini-frames is made up of "S+2" macro-slots: "S+1" RTS/CTS signalling macro-slots and a last P-ACK signalling macro-slot, each of the "S+1" RTS/CTS signalling macro-slots is made up of "P" slots, and each of the "P" slots is itself made up of two mini-slots,
the first mini-slot transports messages of RTS type and the second mini-slot transports messages of CTS type, the P-ACK signalling macro-slot is made up of "P" slots which transport messages of P-ACK type and an unused last slot,
the "i"th slot of each macro-slot of each mini-frame on the "n"th SIG channel is used for the exchange of RTS/CTS reservation signalling to access the "d"th DATA channel such that "d=(n−1)*P+i",
the "i"th slot of the last P-ACK macro-slot of each mini-frame on the "n"th SIG channel is used for the sending of P-ACK messages corresponding to the DATA channel "d", such that "d=(n−1)*P+i",
on the DATA channels, the frame also contains "M+1" (M >=0) mini-frames, the last mini-frame takes on the form of the DATA frame of claim 7,
on the DATA channels, each of the first "M" mini-frames is made up of "S+2" macro-slots: "S+1" DATA macro-slots and a last ACK signalling macro-slot,
each of the "S+1" DATA macro-slots is made up of P DATA slots, the ACK signalling macro-slot is made up of "P" unused slots and a last ACK slot to transport messages of ACK type, the last mini-frame takes on the form of the DATA frame of claim 7.

9. The method according to claim 7, wherein for the frame on the SIG channels, each slot of the macro-slots is made up of three mini-slots: a first mini-slot for the sending of the RTS messages, a second mini-slot for the sending of the CTS messages, and a third mini-slot for the sending of a message of CAC type.

10. The method according to claim 8, wherein the frame is modified on the signalling channels in such a way that each slot of the first "S+1" macro-slots of each mini-frame on the signalling channels is now made up of three mini-slots: a first mini-slot for the sending of the RTS messages, a second mini-slot for the sending of the CTS messages, and a third mini-slot for the sending of a message of CAC type, the last macro-slot (S+2) of the first M mini-frames on the SIG channels is now made up of 2P+1 slots: P P-CAC slots, P P-ACK slots, and an unused last slot, the last macro-slot (S+2) of the first M mini-frames MF on the DATA channels is modified to contain 2P+1 slots: 2P unused slots and a last ACK slot.

11. A synchronous network with TDMA access configured to use a frame comprising a number "S+2" of slots, wherein the synchronous network comprises:
at least one terminal configured to communicate by radio links and comprising a transmission and/or a reception device and a processor;
the at least one terminal configured to transmit such that the first "S" slots each contain two mini-slots MS1(s), MS2(s), the first mini-slot MS1(s) contains a signalling message of RTS type or data, the second mini-slot MS2(s) contains a CTS signalling message or data,
the at least one terminal configured to transmit such that the first mini-slot MS1(S+1) of the slot "S+1" contains an RTS message or data,
the at least one terminal configured to transmit such that the second mini-slot MS2(S+1) contains data,
the at least one terminal configured to transmit such that the first mini-slot MS1(S+2) of the slot "S+2" contains a message of CTS type, and
the at least one terminal configured to transmit such that the second mini-slot MS2(S+2) contains an acknowledgement signalling message of ACK type.

12. A synchronous network according to claim 11, further comprising the following elements:
the frame is divided into "M+1" (M >=0) mini-frames MF(f),
the last mini-frame MF(F+1) takes on the exact form of the frame of claim 11,
the first "S" slots of each mini-frame MF each contain two mini-slots MS1, M32,
the first mini-slot MS1(s) of each slot s contains a signalling message of RTS type, or data,
the second mini-slot MS2(s) of each slot s contains a signalling message of CTS type, or data,
the first mini-slot of the slot "S+1" of each mini-frame [MS1 (S+1), MF] contains an RTS message or data,
the second mini-slot [MS2(S+1), MF] contains data,
the last slot "S+2" of a mini-frame MF is defined as follows:
in the first "M" mini-frames: the first mini-slot of the slot "S+2", MS1(S+2) of each mini-frame MF contains signalling messages of CTS or P-ACK (partial ACK) type, the second mini-slot "S+2", MS2(S+2), contains an acknowledgement signalling message of ACK type,
in the last mini-frame MF(F+1): the first mini-slot [MS1(S+2), MF(F+1)] of the slot "S+2" contains a message of CTS type, the second mini-slot [MS2(S+2), MF(F+1)] contains an acknowledgement signalling message of ACK type.

13. A synchronous network with TDMA access configured to use a frame implementing at least one signalling channel SIG distinct from a data channel DATA, comprising:
at least one terminal configured to communicate by radio links and comprising a transmission and/or a reception device and a processor the at least one terminal configured to transmit such that the frame is supported by two radio channels that are distinct, a signalling channel SIG and a data channel DATA,
the at least one terminal configured to transmit such that the SIG channel takes up the RTS and CTS signalling mini-slots organized in S+1 slots, the last slot S+2 on the SIG channel is not used,
the at least one terminal configured to transmit such that the DATA channel takes up the S+1 data slots DATA and the acknowledgement slot ACK, and
the at least one terminal configured to transmit such that the S+1 signalling slots of the SIG channel correspond to the S+1 data slots of the DATA channel, the unused last slot on the SIG channel corresponds to the ACK slot of the DATA channel.

14. A synchronous network according to claim 12, comprising at least the following elements:
the frame F is divided into M+1 with M≥mini-frames MF(1), . . . , MF(M+1) on a signalling channel and a data channel that are distinct from one another,
the last mini-frame MF(M+1) takes on the form of the frame of claim 12,
the signalling channel SIG takes up the RTS, CTS and P-ACK signalling slots, the data channel DATA takes up the data slots and the ACK slots,
on the signalling channel SIG, the first "M" mini-frames MF are each made up of S+2 slots,
the first "S+1" slots are each made up of a mini-slot for the RTS messages, [MS1, MF, SIG] and a mini-slot for the CTS messages, [MS2, MF, SIG],
the last slot (S+2) contains a first mini-slot [MS1(S+2), MF, SIG] for the partial acknowledgement messages P-ACK and a neutralized (unused) second mini-slot [MS2(S+2), SIG], [MSn, MF(M+1)],
the last mini-frame MF+1 takes on the exact form of the frame of the SIG channel of claim 12 except for the last slot which contains only a neutralized mini-slot,
on the DATA channel, the first "M" mini-frames are each made up of "S+2" slots,
the first "S+1" slots are for the data messages DATA, whereas the last slot of a mini-frame is made up of a neutralized mini-slot MSn(S+2) and a mini-slot MSa (S+2) for the acknowledgement messages ACK.

15. A synchronous network according to claim 12, wherein for the frame on the signalling channel, each slot of the first "S+1" slots is made up of three mini-slots: a first mini-slot MS1 for the sending of the RTS messages, a second mini-slot MS2 for the sending of the CTS messages, and a third mini-slot MS3 for the sending of the messages of channel access confirmation or CAC type.

16. A synchronous network according to claim 15, wherein the frame comprises M+1(M>=0) mini-frames:
each slot of the first "S+1" slots of each mini-frame is made up of three mini-slots: a first mini-slot MS1 for the sending of the RTS messages, a second mini-slot MS2 for the sending of the CTS messages, and a third mini-slot MS3 for the sending of a message of CAC type,
the last slot S+2 of the first M mini-frames on the SIG channel is modified to contain three mini-slots: the first for the sending of the messages of P-CAC type, the second for the sending of the messages of P-ACK type, and an unused third mini-slot,
the last slot S+2 of the first M mini-frames on the data channel DATA is modified to contain three mini-slots:

the first two mini-slots are not used, and the third mini-slot is reserved for the sending of the ACK messages.

17. A synchronous network according to claim 11, wherein it is supported by Ns signalling channels and by Nd data channels, where "Nd" is a multiple of "Ns": "Nd=P*Ns",
on the SIG channels, the frame contains "S+1" RTS/CTS signalling macro-slots, [GS, SIG] and an unused last slot Sn(S+2), each of the signalling macro-slots [GS, SIG] is made up of "P" slots, and each slot is itself made up of two mini-slots $RTS_{n,i}$, $CTS_{n,i}$ with n being the channel number and i the slot number in a macro-slot GS,
the first mini-slot $RTS_{n,i}$ transports messages of RTS type and the second mini-slot $CTS_{n,i}$ transports messages of CTS type,
the "i"th slot of each macro-slot GS on the "n"th signalling channel SIG is used for the exchange of RTS/CTS reservation signalling for accessing the "d"th data channel such that "d=(n−1)*P+i",
on the DATA channels, the frame contains "S+1" DATA macro-slots and a last acknowledgement slot ACK S(ACK),
each of the DATA macro-slots is itself made up of "P" DATA slots.

18. A synchronous network according to claim 17, wherein it is divided into multi-frames and supported by "Ns+Nd" radio channels that are distinct (frequency, code, etc.): "Ns" SIG channels and "Nd" DATA channels, where "Nd" is a multiple of "Ns": "Nd=P*Ns",
on the SIG channels, the frame is divided into "NW" (M >=0) mini-frames, the last mini-frame MF (M+1) is mandatory and takes on the form of the frame of claim 17,
on the SIG channels, each of the first "M" mini-frames MF is made up of "S+2" macro-slots GS: "S+1" RTS/CTS signalling macro-slots GS(RTS/CTS) and a last P-ACK signalling macro-slot, GS(P-ACK),
each of the "S+1" RTS/CTS signalling macro-slots is made up of "P" slots, and each of the "P" slots is itself made up of two mini-slots, $MS1=RTS_{n,i}$, $MS2=CTS_{n,i}$ with n being the signalling channel number and i the number or position of the slot in a macro-slot, the first mini-slot $RTS_{n,i}$ transports messages of RTS type and the second mini-slot $CTS_{n,i}$ transports messages of CTS type,
the P-ACK signalling macro-slot GS(P-$ACK_{n,i}$) is made up of "P" slots which transport messages of P-ACK type and an unused last slot Sn, the last mini-frame MF(M+1) takes on the construction of the first "M" frames except for the last macro-slot which contains only a single unused slot [Sn, MF(M+1)],
the "i"th slot of each macro-slot GS of each mini-frame MF on the "n"th SIG channel is used for the exchange of RTS/CTS reservation signalling for accessing the "d"th DATA channel such that "d=(n−1)*P+i",
the "i"th slot of the last P-ACK macro-slot, GS(P-$ACK_{n,i}$) of each mini-frame MF on the "n"th SIG channel is used for the sending of P-ACK messages corresponding to the DATA channel "d" such that "d=(n−1)*P+i",
on the DATA channels, the frame also contains "M+1" (M >=0) mini-frames MF,
the mini-frame takes on the exact form of the DATA frame of claim 17,
on the DATA channels, each of the first "M" mini-frames MF is made up of "S+2" macro-slots: "S+1" DATA macro-slots and a last ACK signalling macro-slot,
each of the "S+1" DATA macro-slots is made up of P DATA slots, the ACK signalling macro-slot is made up of "P" unused slots Sn and a last ACK slot to transport messages of ACK type,
the last mini-frame MF(M+1) takes on the construction of the first "M" except for the last macro-slot [GS(M+1), ACK] which now contains only a single ACK slot to transport messages of ACK type.

19. A synchronous network according to claim 17, wherein it is supported by 'Ns' SIG channels and 'Nd' DATA channels that are distinct from one another with a validation of the RTS and in that, on the signalling channels SIG, each slot s of the macro-slots GS is now made up of three mini-slots: a first mini-slot MS1 for the sending of the RTS messages, a second mini-slot MS2 for the sending of the CTS messages, and a third mini-slot MS3 for the sending of a message of CAC type.

20. A synchronous network according to claim 19, wherein the frame has a multi-frame structure and wherein:
on the SIG channels, each slot of the first "S+1" macro-slots of each mini-frame is now made up of three mini-slots: a first mini-slot for the sending of the RTS messages, a second mini-slot for the sending of the CTS messages, and a third mini-slot for the sending of a message of CAC type,
the last macro-slot S+2 of the first M mini-frames on the SIG channels is made up of 2P+1 slots: P P-CAC slots, P P-ACK slots, and an unused last slot,
the last macro-slot S+2 of the first M mini-frames on the DATA channels is modified to contain 2P+1 slots: 2P unused slots and a last ACK slot.

* * * * *

UNITED STATES PATENT AND TRADEMARK OFFICE
CERTIFICATE OF CORRECTION

PATENT NO. : 10,104,656 B2
APPLICATION NO. : 14/982336
DATED : October 16, 2018
INVENTOR(S) : Hicham Anouar It is certified that error appears in the above-identified patent and that said Letters Patent is hereby corrected as shown below:

On the Title Page

In the Abstract:
"A method for accessing a radio channel in a communication system that includes a plurality of terminals communicating with one another by radio links, a terminal being equipped with transmission and/or reception device, a processor suitable for executing the steps of the method, wherein it uses an access protocol based on a communication frame made up of a plurality of slots S(1), . . . , S(S+2).The first S slots each comprising two mini-slots. The first mini-slot including a request to send data signalling message RTS or data, the second mini-slot comprising a "ready to receive" signalling message, CTS, or data, the slot (S+1) containing a message of RTS type or data, the slot (S+2) containing a message of CTS type and an acknowledgement message placed at the end of the frame in order to acknowledge one or more transmissions taking place on the radio channel." should be --A method for accessing a radio channel in a communication system that includes a plurality of terminals communicating with one another by radio links, a terminal being equipped with a transmission and/or a reception device, and a processor suitable for executing the steps of the method. The method uses an access protocol based on a communication frame made up of a plurality of slots S(1), . . . , S(S+2). The first S slots each including two mini-slots. The first mini-slot including a request to send data signalling message RTS or data, the second mini-slot including a "ready to receive" signalling message, CTS, or data, the slot (S+1) containing a message of RTS type or data, and the slot (S+2) containing a message of CTS type and an acknowledgement message placed at the end of the frame in order to acknowledge one or more transmissions taking place on the radio channel.--.

In the Claims

In Claim 12, Column 29, Line 39, "M32" should be --MS2--;
In Claim 18, Column 31, Line 32, ""NW" (M>=0)" should be --"M+1" (M>=0)--;
In Claim 18, Column 32, Line 14, "the mini-frame" should be --the last mini-frame--.

Signed and Sealed this
Eighth Day of January, 2019

Andrei Iancu
*Director of the United States Patent and Trademark Office*